US011671609B2

(12) United States Patent
Lin et al.

(10) Patent No.: US 11,671,609 B2
(45) Date of Patent: *Jun. 6, 2023

(54) DC COEFFICIENT SIGNALING AT SMALL QUANTIZATION STEP SIZES

(71) Applicant: Microsoft Technology Licensing, LLC, Redmond, WA (US)

(72) Inventors: Chih-Lung Lin, Redmond, WA (US); Shankar Regunathan, Redmond, WA (US); Sridhar Srinivasan, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,797

(22) Filed: Apr. 26, 2022

(65) Prior Publication Data
US 2022/0256172 A1 Aug. 11, 2022

Related U.S. Application Data

(60) Continuation of application No. 17/348,611, filed on Jun. 15, 2021, now Pat. No. 11,575,913, which is a
(Continued)

(51) Int. Cl.
*H04N 19/18* (2014.01)
*H04N 19/91* (2014.01)
(Continued)

(52) U.S. Cl.
CPC ........... *H04N 19/18* (2014.11); *H04N 19/124* (2014.11); *H04N 19/126* (2014.11);
(Continued)

(58) Field of Classification Search
None
See application file for complete search history.

(56) References Cited

U.S. PATENT DOCUMENTS

| 5,835,145 A * | 11/1998 | Ouyang | .................. H03M 7/40 375/E7.231 |
| 6,148,109 A * | 11/2000 | Boon | ................... H04N 19/182 375/E7.199 |

(Continued)

OTHER PUBLICATIONS

Notice of Allowance dated Nov. 9, 2022, from U.S. Appl. No. 17/348,611, 8 pp.
(Continued)

*Primary Examiner* — Chikaodili E Anyikire
(74) *Attorney, Agent, or Firm* — Klarquist Sparkman, LLP

(57) ABSTRACT

Described tools and techniques relate to signaling for DC coefficients at small quantization step sizes. The techniques and tools can be used in combination or independently. For example, a tool such as a video encoder or decoder processes a VLC that indicates a DC differential for a DC coefficient, a FLC that indicates a value refinement for the DC differential, and a third code that indicates the sign for the DC differential. Even with the small quantization step sizes, the tool uses a VLC table with DC differentials for DC coefficients above the small quantization step sizes. The FLCs for DC differentials have lengths that vary depending on quantization step size.

20 Claims, 12 Drawing Sheets

```
DCDifferential = vlc_decode()
if(DCDifferential != 0) {
  if(DCDifferential == ESCAPECODE) {
    if(QUANT == 1)
       DCDifferential = flc_decode(10);
    else if(QUANT == 2)
       DCDifferential = flc_decode(9);
    else // QUANT is > 2
       DCDifferential = flc_decode(8);
  }
  else { // DCDifferential is not ESCAPECODE
    if(QUANT == 1)
       DCDifferential = DCDifferential*4 + flc_decode(2) - 3;
    else if(QUANT == 2)
       DCDifferential = DCDifferential*2 + flc_decode(1) - 1;
  }
  DCSign = flc_decode(1)
  if (DCSign == 1)
       DCDifferential = -DCDifferential
}
```

Related U.S. Application Data continuation of application No. 16/780,650, filed on Feb. 3, 2020, now Pat. No. 11,070,823, which is a continuation of application No. 16/051,094, filed on Jul. 31, 2018, now Pat. No. 10,554,985, which is a continuation of application No. 15/068,325, filed on Mar. 11, 2016, now Pat. No. 10,063,863, which is a continuation of application No. 12/815,029, filed on Jun. 14, 2010, now Pat. No. 9,313,509, which is a division of application No. 10/893,168, filed on Jul. 17, 2004, now Pat. No. 7,738,554.

(60) Provisional application No. 60/488,710, filed on Jul. 18, 2003.

(51) Int. Cl.
*H04N 19/70* (2014.01)
*H04N 19/46* (2014.01)
*H04N 19/61* (2014.01)
*H04N 19/124* (2014.01)
*H04N 19/126* (2014.01)
*H04N 19/136* (2014.01)
*H04N 19/137* (2014.01)
*H04N 19/17* (2014.01)
*H04N 19/184* (2014.01)
*H04N 19/186* (2014.01)
*H04N 19/44* (2014.01)
*H04N 19/625* (2014.01)
*H04N 19/176* (2014.01)

(52) U.S. Cl.
CPC ......... *H04N 19/136* (2014.11); *H04N 19/137* (2014.11); *H04N 19/17* (2014.11); *H04N 19/176* (2014.11); *H04N 19/184* (2014.11); *H04N 19/186* (2014.11); *H04N 19/44* (2014.11); *H04N 19/46* (2014.11); *H04N 19/61* (2014.11); *H04N 19/625* (2014.11); *H04N 19/70* (2014.11); *H04N 19/91* (2014.11)

(56) References Cited

U.S. PATENT DOCUMENTS

| | | | |
|---|---|---|---|
| 7,426,308 | B2 | 9/2008 | Hsu et al. |
| 7,580,584 | B2 | 8/2009 | Holcomb et al. |
| 7,602,851 | B2 | 10/2009 | Lee et al. |
| 7,738,554 | B2 | 6/2010 | Lin et al. |
| 8,218,624 | B2 | 7/2012 | Holcomb et al. |
| 9,313,509 | B2 | 4/2016 | Lin et al. |
| 10,063,863 | B2 | 8/2018 | Lin et al. |
| 10,554,985 | B2 | 2/2020 | Lin et al. |
| 10,659,793 | B2 | 5/2020 | Lin et al. |
| 10,924,749 | B2 | 2/2021 | Holcomb et al. |
| 10,958,916 | B2 | 3/2021 | Holcomb et al. |
| 10,958,917 | B2 | 3/2021 | Holcomb et al. |
| 11,070,823 | B2 | 7/2021 | Lin et al. |
| 11,245,910 | B2 | 2/2022 | Holcomb et al. |
| 11,272,194 | B2 | 3/2022 | Holcomb et al. |
| 11,356,678 | B2 | 6/2022 | Holcomb et al. |
| 11,570,451 | B2 | 1/2023 | Holcomb et al. |
| 11,575,913 | B2 | 2/2023 | Lin et al. |
| 2022/0191518 | A1 | 6/2022 | Holcomb et al. |
| 2022/0256170 | A1 | 8/2022 | Holcomb et al. |
| 2022/0256171 | A1 | 8/2022 | Holcomb et al. |
| 2022/0264121 | A1 | 8/2022 | Lin et al. |

OTHER PUBLICATIONS

Office Action dated Jul. 14, 2022, from U.S. Appl. No. 17/348,611, 6 pp.
Office Action dated Nov. 25, 2022, from U.S. Appl. No. 17/551,924, 7 pp.
Notice of Allowance dated Dec. 21, 2022, from U.S. Appl. No. 17/551,924, 8 pp.
Notice of Allowance dated Mar. 1, 2023, from U.S. Appl. No. 17/688,585, 8 pp.
Notice of Allowance dated Mar. 6, 2023, from U.S. Appl. No. 17/729,516, 7 pp.
Office Action dated Jan. 26, 2023, from U.S. Appl. No. 17/688,585, 6 pp.
Office Action dated Feb. 9, 2023, from U.S. Appl. No. 17/729,516, 6 p.
Notice of Allowance dated Apr. 7, 2023, from U.S. Appl. No. 17/729,675, 11 pp.
Office Action dated Mar. 17, 2023, from U.S. Appl. No. 17/729,675, 6 pp.
Office Action dated Mar. 17, 2023, from U.S. Appl. No. 17/729,876, 6 pp.

\* cited by examiner

Figure 1, Prior Art
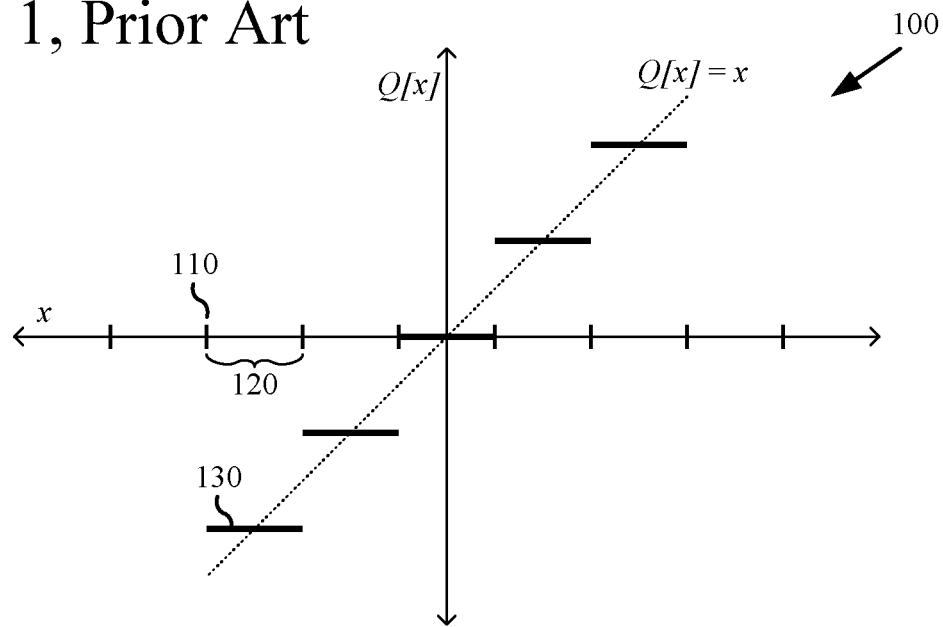
Figure 2a, Prior Art
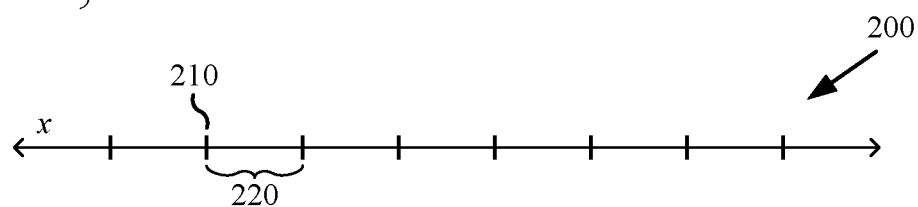
Figure 2b, Prior Art
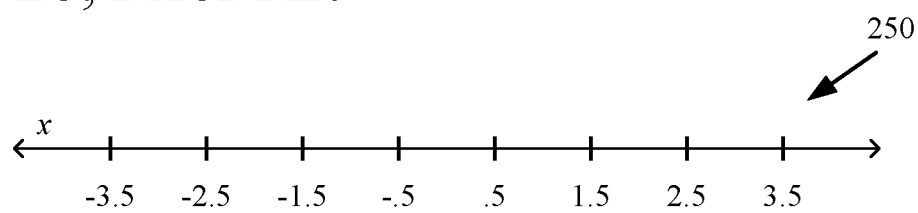

Figure 3, Prior Art
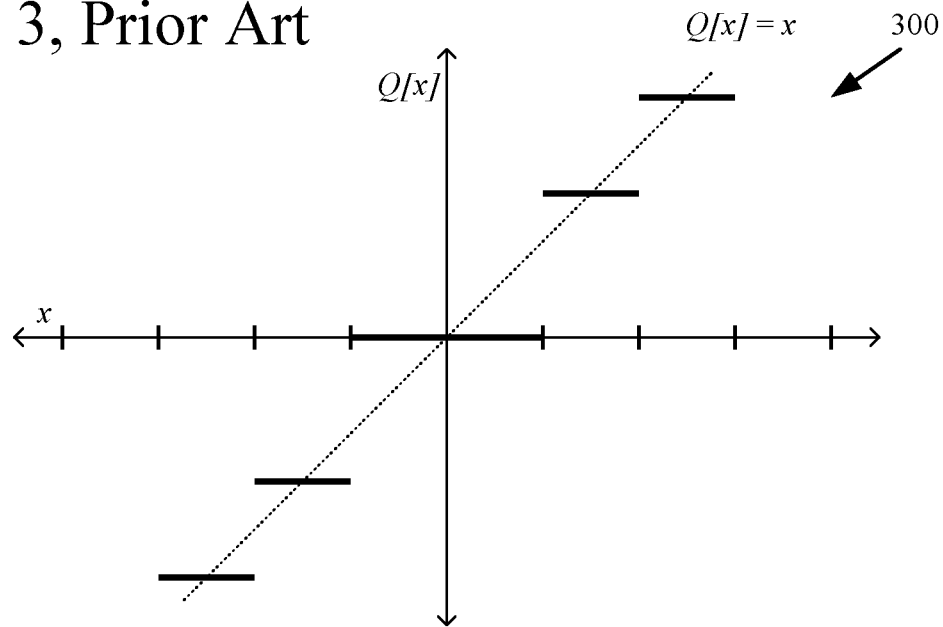
Figure 4a, Prior Art
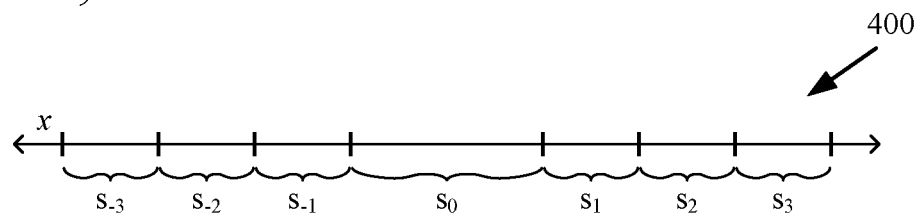
Figure 4b, Prior Art
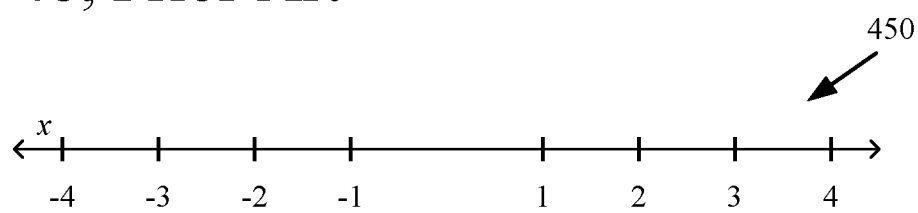

Figure 5, Prior Art
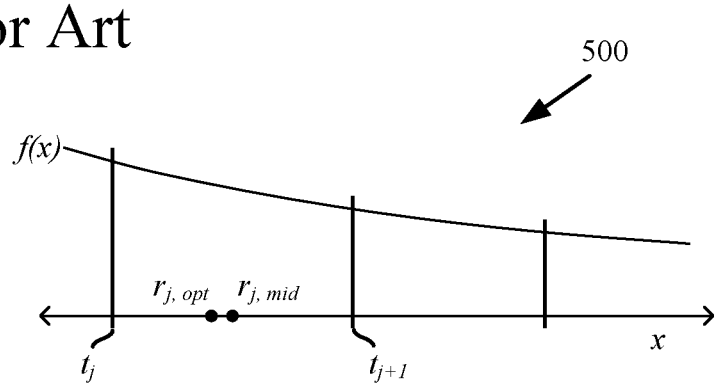
Figure 6, Prior Art
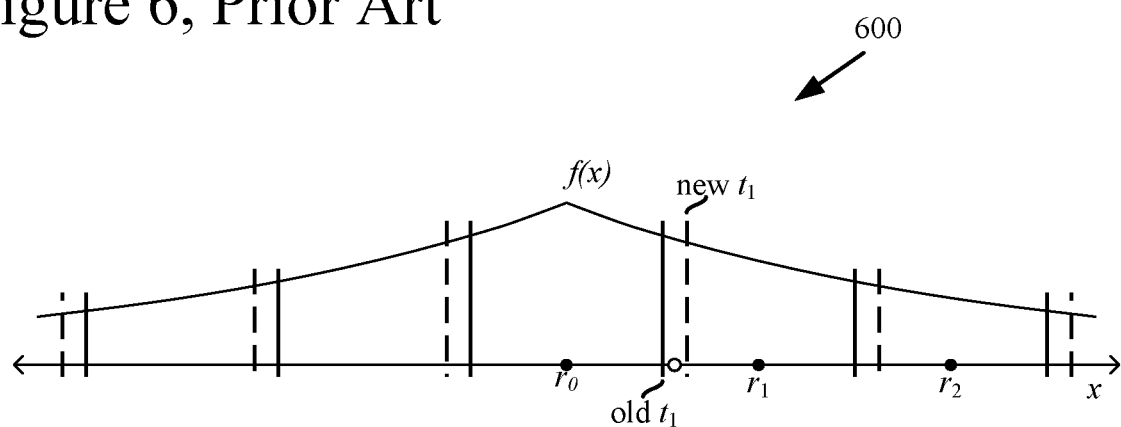

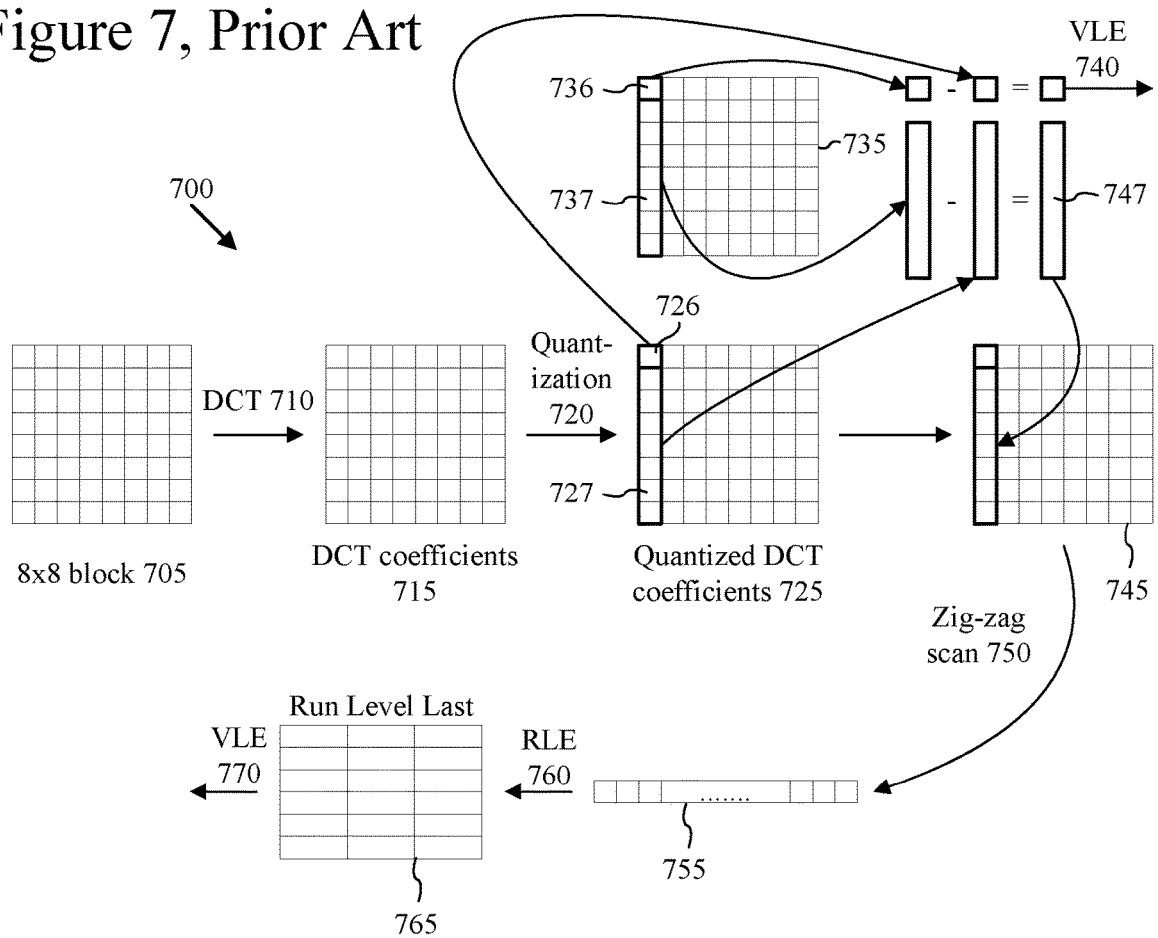
Figure 7, Prior Art

Software 880 implementing video encoder and/or decoder with special signaling for DC coefficients at small quantization step sizes

Figure 12

```
DCDifferential = vlc_decode()
if(DCDifferential != 0) {
   if(DCDifferential == ESCAPECODE) {
       if(QUANT == 1)
           DCDifferential = flc_decode(10);
       else if(QUANT == 2)
           DCDifferential = flc_decode(9);
        else // QUANT is > 2
           DCDifferential = flc_decode(8);
      }
   else {  // DCDifferential is not ESCAPECODE
      if(QUANT == 1)
          DCDifferential = DCDifferential*4 + flc_decode(2) - 3;
      else if(QUANT == 2)
          DCDifferential = DCDifferential*2 + flc_decode(1) - 1;
      }
   DCSign = flc_decode(1)
   if (DCSign == 1)
         DCDifferential = -DCDifferential
}
```

DC COEFFICIENT SIGNALING AT SMALL QUANTIZATION STEP SIZES

CROSS REFERENCE TO RELATED APPLICATIONS

This application is a continuation of U.S. patent application Ser. No. 17/348,611, filed Jun. 15, 2021, which is a continuation of U.S. patent application Ser. No. 16/780,650, filed Feb. 3, 2020, now U.S. Pat. No. 11,070,823, which is a continuation of U.S. patent application Ser. No. 16/051,094, filed Jul. 31, 2018, now U.S. Pat. No. 10,554,985, which is a continuation of U.S. patent application Ser. No. 15/068,325, filed Mar. 11, 2016, now U.S. Pat. No. 10,063,863, which is a continuation of U.S. patent application Ser. No. 12/815,029, filed Jun. 14, 2010, now U.S. Pat. No. 9,313,509, which is a divisional of U.S. patent application Ser. No. 10/893,168, filed Jul. 17, 2004, now U.S. Pat. No. 7,738,554, the disclosure of which is incorporated herein by reference. U.S. patent application Ser. No. 10/893,168 claims the benefit of U.S. Provisional Patent Application Ser. No. 60/488,710, filed Jul. 18, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The invention relates generally to video and other digital media coding and decoding, and more particularly relates to signaling DC coefficients in video and other digital media coding and decoding.

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Images with higher resolution tend to look crisper than other images and contain more discernable useful details. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width × Height) | Frame Rate (in frames per second) | Bit Rate (in millions of bits per second) |
| --- | --- | --- | --- |
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Decompression (also called decoding) reconstructs a version of the original information from the compressed form. A "codec" is an encoder/decoder system. Two categories of compression are lossless compression and lossy compression.

Lossless compression reduces the bit rate of information by removing redundancy from the information without any reduction in fidelity. For example, a series of ten consecutive pixels that are all exactly the same shade of red could be represented as a code for the particular shade of red and the number ten as a "run length" of consecutive pixels, and this series can be perfectly reconstructed by decompression from the code for the shade of red and the indicated number (ten) of consecutive pixels having that shade of red. Lossless compression techniques reduce bit rate at no cost to quality, but can only reduce bit rate up to a certain point. Decreases in bit rate are limited by the inherent amount of variability in the statistical characterization of the input data, which is referred to as the source entropy. Entropy coding is another term for lossless compression.

In contrast, with lossy compression, the quality suffers somewhat but the achievable decrease in bit rate is more dramatic. For example, a series of ten pixels, each being a slightly different shade of red, can be approximated as ten pixels with exactly the same particular approximate red color. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—in a system design in which the lossy compression establishes an approximation of the information and lossless compression techniques are applied to represent the approximation. For example, the series of ten pixels, each a slightly different shade of red, can be represented as a code for one particular shade of red and the number ten as a run-length of consecutive pixels. In decompression, the original series would then be reconstructed as ten pixels with the same approximated red color.

II. Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers

According to one possible definition, a scalar quantizer is an approximating functional mapping x→Q[x] of an input value x to a quantized value Q[x]. FIG. 1 shows a "staircase" I/O function (100) for a scalar quantizer. The horizontal axis is a number line for a real number input variable x, and the vertical axis indicates the corresponding quantized values Q[x]. The number line is partitioned by thresholds such as the threshold (110). Each value of x within a given range between a pair of adjacent thresholds is assigned the same quantized value Q[x]. For example, each value of x within the range (120) is assigned the same quantized value (130). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 1) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 2a shows a generalized classifier (200) and thresholds for a scalar quantizer. As in FIG. 1, a number line for a real number variable x is segmented by thresholds such as the threshold (210). Each value of x within a given range such as the range (220) is assigned the same quantized value Q[x]. FIG. 2b shows a numerical example of a classifier (250) and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x]=\beta[A[x]] \quad (1).$$

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 1) and therefore Q[Q[x]] will typically be equal to Q[x]. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\bar{D}=E_x\{d(X-Q[X])\}$ is lower for an equal or lower entropy H of A[X]. The most commonly-used distortion measure is the squared error distortion measure, for which $d(|x-y|)=|x-y|^2$. When the squared error distortion measure is used, the expected value of the distortion measure ($\bar{D}$) is referred to as the mean squared error.

B. Dead Zone+Uniform Threshold Quantizers

According to one possible definition, a dead zone plus uniform threshold quantizer ["DZ+UTQ"] is a quantizer with uniformly spaced threshold values for all classifier regions except the one containing the zero input value (which is called the dead zone ["DZ"]). A DZ+UTQ has a classifier index mapping rule x→A[x] that can be expressed based on two parameters. FIG. 3 shows a staircase I/O function (300) for a DZ+UTQ, and FIG. 4a shows a generalized classifier (400) and thresholds for a DZ+UTQ. The parameter s, which is greater than 0, indicates the step size for all steps other than the DZ. Mathematically, all $s_i$ are equal to s for i≠0. The parameter z, which is greater than or equal to 0, indicates the ratio of the DZ size to the size of the other steps. Mathematically, $s_0=z\cdot s$. In FIG. 4a, z is 2, so the DZ is twice as wide as the other classification zones. The index mapping rule x→A[x] for a DZ+UTQ can be expressed as:

$$A[x] = \text{sign}\ (x) * \max\left(0, \left\lfloor \frac{|x|}{s} - \frac{z}{2} + 1 \right\rfloor\right), \quad (2)$$

where ⌊•⌋ denotes the smallest integer less than or equal to the argument and where sign(x) is the function defined as:

$$\text{sign}\ (x) = \begin{cases} +1, & \text{for } x \geq 0, \\ -1, & \text{for } x < 0. \end{cases} \quad (3)$$

FIG. 4b shows a numerical example of a classifier (450) and thresholds for a DZ+UTQ with s=1 and z=2. FIGS. 1, 2a, and 2b show a special case DZ+UTQ with z=1. Quantizers of the UTQ form have good performance for a variety of statistical sources. In particular, the DZ+UTQ form is optimal for the statistical random variable source known as the Laplacian source.

In some system designs (not shown), an additional consideration may be necessary to fully characterize a DZ+UTQ classification rule. For practical reasons there may be a need to limit the range of values that can result from the classification function A[x] to some reasonable finite range. This limitation is referred to as clipping. For example, in some such systems the classification rule could more precisely be defined as:

$$A[x] = \text{sign}\ (x) * \min\left[g, \max\left(0, \left\lfloor \frac{|x|}{s} - \frac{z}{2} + 1 \right\rfloor\right)\right], \quad (4)$$

where g is a limit on the absolute value of A[x]. In much of the theoretical analysis presented herein, consideration of clipping is omitted as it unduly complicates the analysis without advancing the explanation. Moreover, although the clipping shown in the above example is symmetric about zero, the clipping does not need to be symmetric, and often is not exactly symmetric. For example, a common clipping range would be such that the value of A[x] is limited to some range from $-2^B$ to $+2^B-1$ so that A[x] can be represented as an integer using a two's complement representation that uses B+1 bits, where B+1 may be equal to 8 or 16 or another particular selected number of bits.

C. Reconstruction Rules

Different reconstruction rules may be used to determine the reconstruction value for each quantization index. These include the optimal reconstruction rule and the single offset reconstruction rule (of which the mid-point reconstruction rule is an example). FIG. 5 shows reconstruction points according to different reconstruction rules for a particular shape of a source probability distribution function $f(x)$. For a range of values between two thresholds $t_j$ and $t_{j+1}$, the reconstruction value $r_{j,mid}$ according to the mid-point reconstruction rule bisects the range (thus, $r_{j,mid}=(t_j,t_{j+1})/2$). For the example probability distribution function shown in FIG. 5, this fails to account for the fact that values to the left of the mid-point are more likely than values to the right of the mid-point. The reconstruction value $r_{j,opt}$ according to the optimal reconstruction rule accounts for the probability distribution.

In general, a probability distribution function ["pdf"] indicates the probabilities for the different values of a variable. One possible definition of the optimal reconstruction value $r_{j,opt}$ for each region between two neighboring thresholds $t_j$ and $t_{j+1}$ for a pdf $f(x)$ can be expressed as:

$$r_{j,opt} = \min_{y}^{-1} \int_{t_j}^{t_{j+1}} d(x-y)f(x)dx. \quad (5)$$

Assuming that the pdf $f(x)$ for a given source is symmetric around zero, one possible definition of the optimal reconstruction rule of a DZ+UTQ for a symmetric, difference-based distortion measure $d(|x-y|)$ is:

$$\beta[k] = \begin{cases} \min_{y}^{-1} \int_{0}^{\frac{zs}{2}} [d(|x-y|)+d(|y-x|)]f(x)dx, & \text{for } k=0, \\ \text{sign}(k)\min_{y}^{-1} \int_{\frac{zs}{2}+(|k|-1)s}^{\frac{zs}{2}+|k|s} d(|x-y|)f(x)d, & \text{for } k \neq 0. \end{cases} \quad (6)$$

where y is the quantized value Q[x], and where the rule finds the quantized value Q[x] that results in the smallest distortion according to the distortion measure. Typically, the optimal quantized value for β[0] is equal to 0, and that will be assumed to be true for the remainder of this description. For minimizing mean squared error, the optimal reconstruction rule sets the reconstruction value for each region equal to the conditional mean of the input values in that region. Stated more precisely, the optimal reconstruction value $r_{j,opt}$ for the region between two neighboring thresholds $t_j$ and $t_{j+1}$ for a pdf $f(x)$ when using the mean squared error distortion measure is given by $$r_{j,opt} = \frac{\int_{t_j}^{t_{j+1}} x \cdot f(x)dx}{\int_{t_j}^{t_{j+1}} f(x)dx}. \quad (7)$$

According to one possible definition for a DZ+UTQ, the single-offset reconstruction rule is based on an offset parameter Δ, where ordinarily 0<Δ≤s/2, and the rule is:

$$\beta[k] = \begin{cases} 0, & \text{for } k=0, \\ \text{sign}(k)[(|k|+\frac{z}{2}-1)s+\Delta], & \text{for } k \neq 0. \end{cases} \quad (8)$$

The mid-point reconstruction rule is a special case of the single-offset reconstruction rule, specified by Δ=s/2. Mid-point reconstruction is commonly used for convenience due to its simplicity. And, in the limit as s becomes very small, the performance of the mid-point rule becomes optimal under a variety of well-behaved mathematical conditions.

D. Specifying Reconstruction Values, Constructing Classifiers

Standards and product specifications that focus only on achieving interoperability will often specify reconstruction values without necessarily specifying the classification rule. In other words, some specifications may define the functional mapping k→β[k] without defining the functional mapping x→A[x]. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal. FIG. 6 shows such adjusted thresholds for a classifier (600). The original thresholds (such as old $t_j$) are situated halfway between the reconstruction points. The thresholds are moved outward on the number line, away from 0. Before the adjustment, a marginal value (shown between the old $t_j$ and the new $t_j$) is mapped to $r_j$. After the adjustment, the marginal value is mapped to $r_0$. The decoder performs reconstruction without knowledge of the adjustments done in the encoder.

For optimal encoding, an encoder may adjust quantization thresholds to optimally fit a given set of reconstruction values as follows. The probability $p_j$ for the source random variable X to fall within a range j between $t_j$ and $t_{j+1}$ (where $t_{j+1}>t_j$) for a source pdf $f(x)$ is:

$$p_j = \int_{t_j}^{t_{j+1}} f(x)dx, \quad (9)$$

and the number of bits necessary to represent an event with probability $p_j$ in an ideal lossless communication system may be quantified as:

$$h_j = \log_2 \frac{1}{p_j}, \quad (10)$$

where the $h_j$ is expressed in terms of bits. The total entropy of the classifier is then given by $$H = \sum_j p_j \cdot h_j \text{ bits.} \quad (11)$$

In general, if the encoder is required to use $b_j$ bits to indicate the selection of the reconstruction value $r_j$, the encoder may evaluate and optimize its thresholds according to minimization of the rate-distortion relation $D+\lambda R$, where D indicates distortion, R indicates bit usage, and $\lambda$ is a tuning parameter for favoring a particular selected balance between distortion and bit rate. For each particular threshold $t_{j+1}$ between two points $r_j$ and $r_{j+1}$, the encoder can set $t_{j+1}$ to the x that satisfies:

$$d(x-r_j)+\lambda b_j = d(x-r_{j+1})+\lambda b_{j+1} \quad (12).$$

In an ideal design, $b_j$ will be approximately equal to $h_j$, and modern lossless coding techniques can be used to very nearly achieve this goal. In a design using some non-ideal lossless coding technique to represent the output of the classifier, $b_j$ may have some other value.

Note in summation that optimal decision thresholds can be selected using equation (12), that optimal reconstruction values can be selected using equation (5) or (7), and that optimal bit usage can be computed by setting $b_j$ equal to $h_j$ as given by equation (10) or to the number of bits used in some other lossless code (such as a Huffman code designed using equation (9) or a fixed-length code). In some highly-optimized scalar quantizer system designs, reconstruction values (initially uniformly spaced) are analyzed to adjust thresholds in encoder analysis, then use of the adjusted thresholds is analyzed to set the number of bits needed to represent the output of the classifier using lossless coding and to set the reconstruction values in decoder analysis. The new reconstruction values are then analyzed to adjust thresholds, and so on, until the thresholds and/or reconstruction values stabilize across iterations.

III. Compression and Decompression Systems

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called reference or anchor frames).

Both intra and inter-picture compression techniques often use a reversible frequency transform operation, which generates a set of frequency domain (i.e., spectral) coefficients. For intra-picture compression, the transform is typically applied to a block of samples. For inter-picture compression, the transform is typically applied to a block of motion-compensation prediction residual information. A discrete cosine transform ["DCT"] is a type of frequency transform. The resulting blocks of transform coefficients are quantized and entropy encoded. A decoder typically entropy decodes and reconstructs transform coefficients (e.g., DCT coefficients) that were quantized and performs an inverse frequency transform such as an IDCT.

A. Intra-Compression in Windows Media Video, Version 8 ["WMV8"]

Microsoft Corporation's Windows Media Video, Version 8 ["WMV8"] includes a video encoder and a video decoder. The WMV8 encoder uses intra-frame and inter-frame compression, and the WMV8 decoder uses intra-frame and inter-frame decompression.

FIG. 7 illustrates block-based intraframe compression (700) of a 8×8 block (705) of samples in a frame in the WMV8 encoder. The WMV8 encoder here splits a frame into 8×8 blocks of samples and applies an 8×8 DCT (710) to individual blocks such as the block (705). The encoder quantizes (720) the DCT coefficients (715), resulting in an 8×8 block of quantized DCT coefficients (725). For example, the encoder applies a uniform, scalar quantization step size to each coefficient.

Further encoding varies depending on whether a coefficient is a DC coefficient, an AC coefficient in the top row or left column, or another AC coefficient. The encoder encodes the DC coefficient (726) as a differential from the DC coefficient (736) of a neighboring 8×8 block, which is a previously encoded top or left neighbor block. The encoder entropy encodes (740) the differential. The entropy encoder can encode the left column or top row of AC coefficients as differentials from a corresponding column or row of a neighboring 8×8 block. FIG. 7 shows the left column (727) of AC coefficients encoded as differentials (747) from the left column (737) of the neighboring (actually situated to the left) block (735). The encoder scans (750) the 8×8 block (745) of predicted, quantized AC DCT coefficients into a one-dimensional array (755) and then entropy encodes the scanned coefficients using a variation of run length coding (760). The encoder selects an entropy code from one or more run/level/last tables (765) and outputs the entropy code.

A WMV8 decoder (not shown) produces a reconstructed version of the original block (705). The decoder determines the DC predictor for the DC coefficient and decodes the DC differential. In particular, the following pseudocode illustrates the DC differential decoding process in WMV8.

DCDifferential=vlc_decode( )
if (DCDifferential=ESCAPECODE)
DCDifferential=flc_decode(8)
DCSign=flc_decode(1)
if (DCSign==1)
DCDifferential=−DCDifferential The WMV8 decoder combines the DC differential with the predictor for the DC coefficient to reconstruct the DC coefficient. The decoder entropy decodes the AC coefficients using one or more run/level/last tables, and scans the coefficients back into a two-dimensional array. The WMV decoder computes a predictor for the top row or left column of AC coefficients if appropriate. The decoder inverse quantizes the coefficients and performs an IDCT.

While DC differential coding and decoding as in WMV8 provide good performance in many scenarios, there are opportunities for improvement. In particular, DC differential coding and decoding as in WMV8 are not easily applied for smaller quantization sizes. This is because at the smaller quantization sizes, VLC code table size for DC differentials becomes inefficiently large for many devices for practical applications.

B. Video Codec Standards

Various standards specify aspects of video decoders as well as formats for compressed video information. These standards include H.261, MPEG-1, H.262 (also called MPEG-2), H.263, and MPEG-4. Directly or by implication, these standards may specify certain encoder details, but other encoder details are not specified. Different standards incorporate different techniques, but each standard typically specifies some kind of inverse frequency transform and entropy decoding. For information, see the respective standard documents.

SUMMARY

Described tools and techniques relate to coding of DC coefficients in video and other digital media coding. More particularly, the techniques and tools relate to signaling for DC coefficients at small quantization step sizes. The techniques and tools can be used in combination or independently.

According to a first set of tools and techniques, a tool such as a video encoder or decoder processes a first code that indicates a DC differential for a DC coefficient and a second code that indicates a value refinement for the DC differential. For example, a video encoder encodes the DC coefficient based at least in part on the first and second codes. Or, a video decoder reconstructs the DC coefficient during decoding based at least in part on the first and second codes.

According to a second set of tools and techniques, a tool such as a video encoder or decoder processes a VLC for a first DC differential for a first DC coefficient at a first quantization step size. The tool uses a VLC table that indicates DC differentials for DC coefficients at and above a second quantization step size larger than the first quantization step size.

According to a third set of tools and techniques, a tool such as a video encoder or decoder processes a code for a DC differential for a DC coefficient, where the code is a FLC having a length that varies depending on quantization step size. For example, the FLC indicates a refinement value for the DC differential. Or, when an escape code is used for the DC differential, the FLC indicates a value for the DC differential.

Additional features and advantages will be made apparent from the following detailed description of various embodiments that proceeds with reference to the accompanying drawings.

BRIEF DESCRIPTION OF THE DRAWINGS

FIG. 1 is a chart showing a staircase I/O function for a scalar quantizer according to the prior art.

FIGS. 2a and 2b are charts showing classifiers and thresholds for scalar quantizers according to the prior art.

FIG. 3 is a chart showing a staircase I/O function for a DZ+UTQ according to the prior art.

FIGS. 4a and 4b are charts showing classifiers and thresholds for DZ+UTQs according to the prior art.

FIG. 5 is a chart showing reconstruction points for different reconstruction rules for a given pdf shape according to the prior art.

FIG. 6 is a chart showing adjustments to a classifier for a scalar quantizer according to the prior art.

FIG. 7 is a block diagram showing block-based intra-compression according to the prior art.

FIG. 12 is a listing of DC differential decoding pseudo-code.

DETAILED DESCRIPTION

Described embodiments relate to techniques and tools for signaling DC coefficients at small quantization step sizes. The various techniques and tools can be used in combination or independently.

I. Computing Environment

Figure 8:
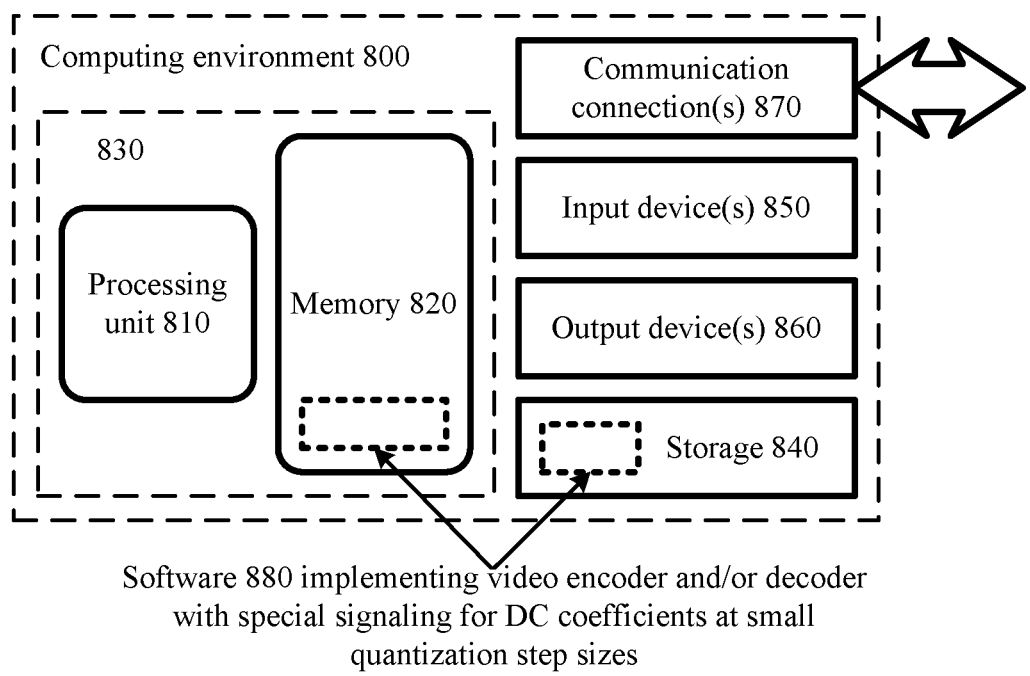
FIG. 8 is a block diagram of a suitable computing environment in which several described embodiments may be implemented.

FIG. 8 illustrates a generalized example of a suitable computing environment (800) in which several of the described embodiments may be implemented. The computing environment (800) is not intended to suggest any limitation as to scope of use or functionality, as the techniques and tools may be implemented in diverse general-purpose or special-purpose computing environments.

With reference to FIG. 8, the computing environment (800) includes at least one processing unit (810) and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing an encoder and/or decoder with special signaling of DC coefficients at small quantization step sizes.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, DVDs, or any other medium which can be used to store information and which can be accessed within the computing environment (800). The storage (840) stores instructions for the software (880) implementing the encoder and/or decoder.

The input device(s) (850) may be a touch input device such as a keyboard, mouse, pen, or trackball, a voice input device, a scanning device, or another device that provides input to the computing environment (800). For audio or video encoding, the input device(s) (850) may be a sound card, video card, TV tuner card, or similar device that accepts audio or video input in analog or digital form, or a CD-ROM or CD-RW that reads audio or video samples into the computing environment (800). The output device(s)

(860) may be a display, printer, speaker, CD-writer, or another device that provides output from the computing environment (800).

The communication connection(s) (870) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Video Encoder and Decoder

Figure 9:
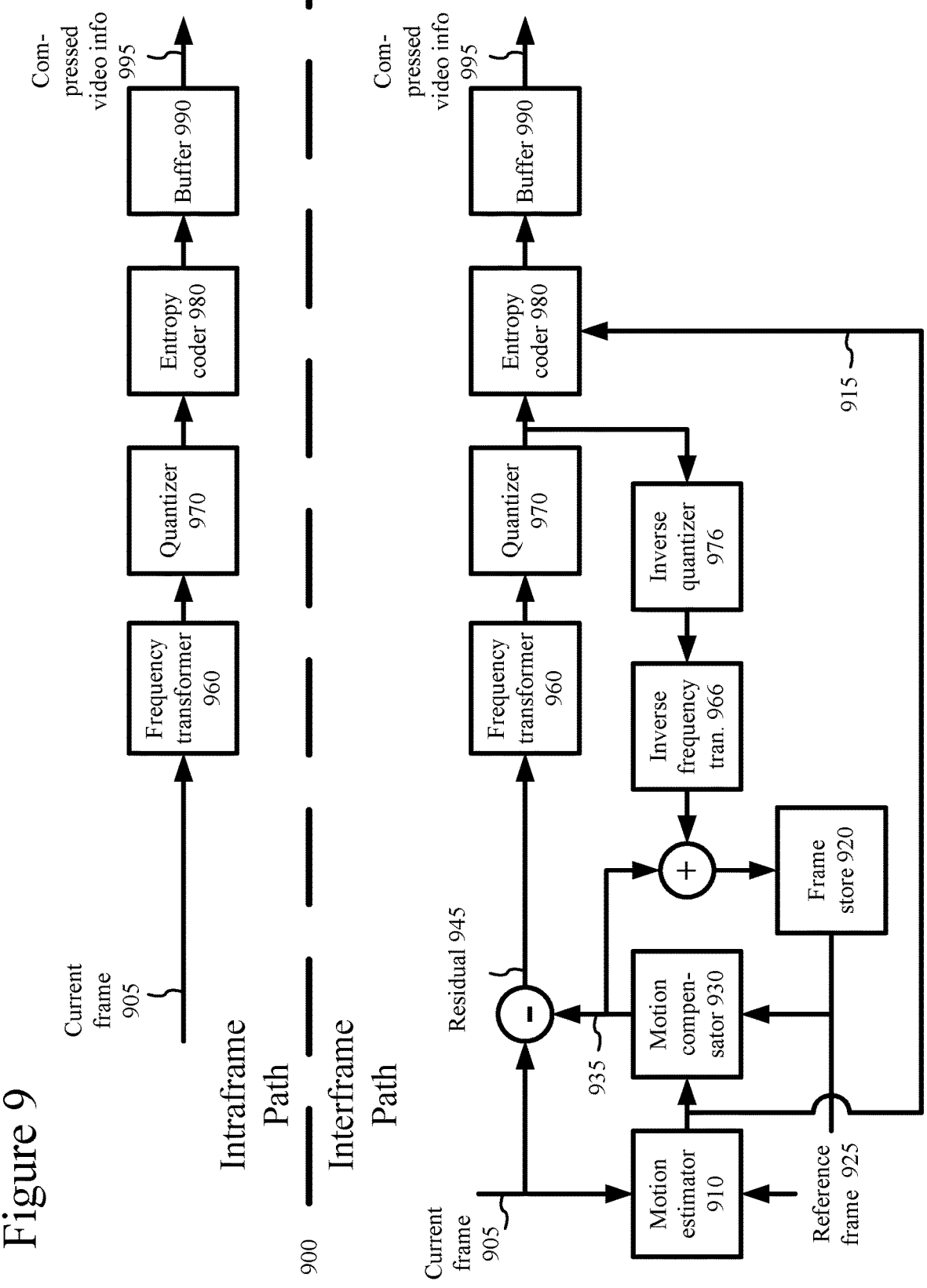
FIGS. 9 and 10 are block diagrams of a video encoder system and a video decoder system, respectively, in conjunction with which several described embodiments may be implemented.
Figure 10:
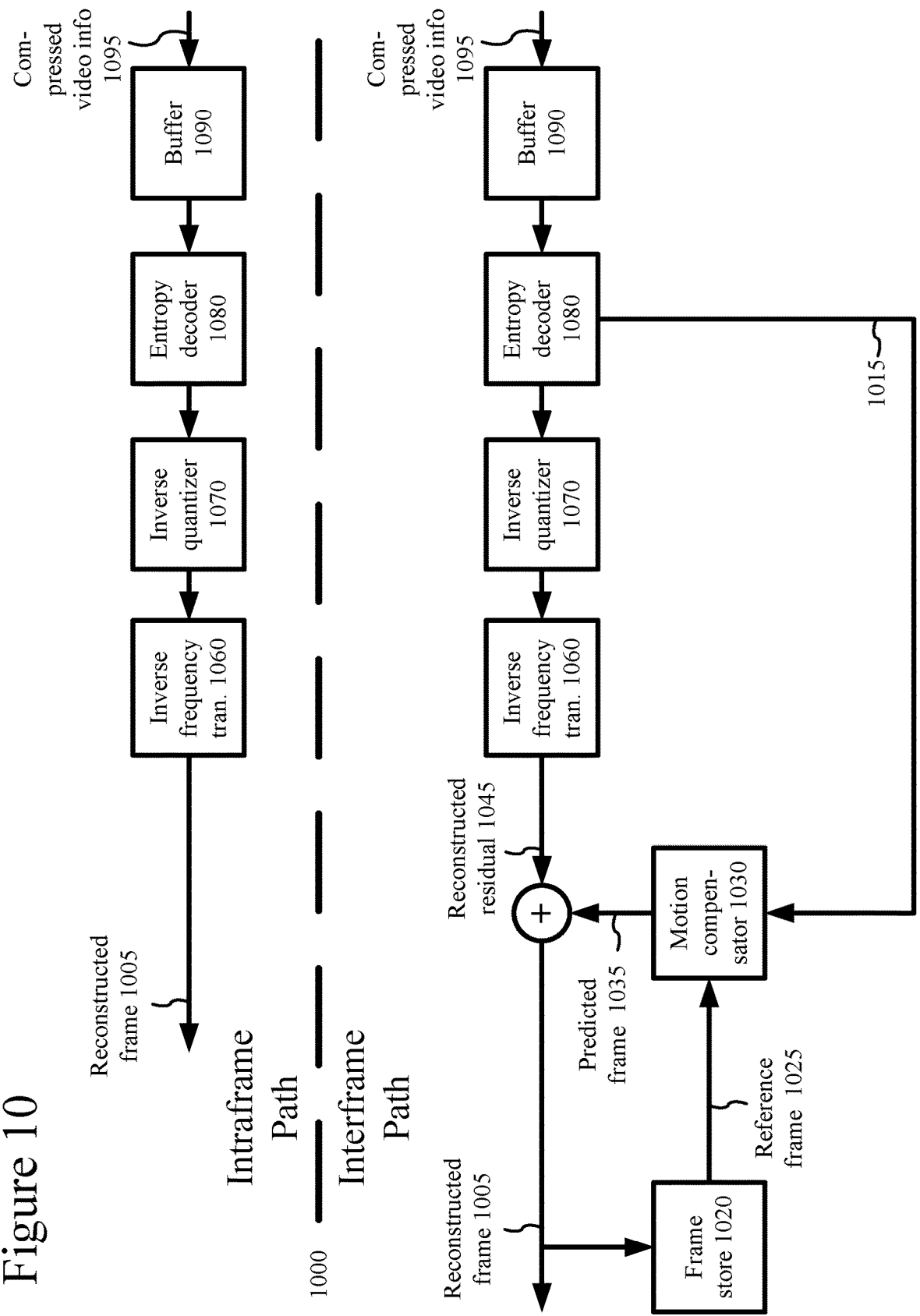

FIG. 9 is a block diagram of a generalized video encoder system (900), and FIG. 10 is a block diagram of a video decoder system (1000), in conjunction with which various described embodiments may be implemented.

The relationships shown between modules within the encoder and decoder indicate the main flow of information in the encoder and decoder; other relationships are not shown for the sake of simplicity. In particular, FIGS. 9 and 10 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (900) and decoder (1000) are block-based and use a 4:2:0 macroblock format, with each macroblock including four 8×8 luminance blocks (at times treated as one 16×16 macroblock) and two 8×8 chrominance blocks. Alternatively, the encoder (900) and decoder (1000) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Encoder

FIG. 9 is a block diagram of a general video encoder system (900) that can perform joint entropy coding and bitstream formation operations for variable-size transform information. The encoder system (900) receives a sequence of video frames including a current frame (905), and produces compressed video information (995) as output. Particular embodiments of video encoders typically use a variation or supplemented version of the generalized encoder (900).

The encoder system (900) compresses predicted frames and key frames. For the sake of presentation, FIG. 9 shows a path for key frames through the encoder system (900) and a path for forward-predicted frames. Many of the components of the encoder system (900) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called an I-frame or intra-coded frame) is compressed without reference to other frames.

If the current frame (905) is a forward-predicted frame, a motion estimator (910) estimates motion of macroblocks or other sets of pixels of the current frame (905) with respect to a reference frame, which is a reconstructed previous frame (925) buffered in the frame store (920). In alternative embodiments, the reference frame is a later frame or the current frame is bi-directionally predicted. The motion estimator (910) can estimate motion by pixel, ½ pixel, ¼ pixel, or other increments, and can switch the precision of the motion estimation on a frame-by-frame basis or other basis. The precision of the motion estimation can be the same or different horizontally and vertically. The motion estimator (910) outputs as side information motion information (915) such as motion vectors. A motion compensator (930) applies the motion information (915) to the reconstructed previous frame (925) to form a motion-compensated current frame (935). The prediction is rarely perfect, however, and the difference between the motion-compensated current frame (935) and the original current frame (905) is the prediction residual (945). Alternatively, a motion estimator and motion compensator apply another type of motion estimation/compensation.

For DC coefficients at small quantization step sizes, the encoder signals DC coefficients using a syntax and code tables such as those described below. In particular, the encoder uses the code tables and produces an output bitstream in compliance with the syntax below.

A frequency transformer (960) converts the spatial domain video information into frequency domain (i.e., spectral) data. For block-based video frames, the frequency transformer (960) applies a DCT or variant of DCT to blocks of the pixel data or prediction residual data, producing blocks of DCT coefficients. Alternatively, the frequency transformer (960) applies another conventional frequency transform such as a Fourier transform or uses wavelet or subband analysis. In embodiments in which the encoder uses spatial extrapolation (not shown in FIG. 9) to encode blocks of key frames, the frequency transformer (960) can apply a re-oriented frequency transform such as a skewed DCT to blocks of prediction residuals for the key frame. The frequency transformer (960) applies an 8×8, 8×4, 4×8, or other size frequency transforms (e.g., DCT) to prediction residuals for predicted frames.

A quantizer (970) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (900) can use frame dropping, adaptive filtering, or other techniques for rate control.

If a given macroblock in a predicted frame has no information of certain types (e.g., no motion information for the macroblock and no residual information), the encoder (900) may encode the macroblock as a skipped macroblock. If so, the encoder signals the skipped macroblock in the output bitstream of compressed video information (995).

When a reconstructed current frame is needed for subsequent motion estimation/compensation, an inverse quantizer (976) performs inverse quantization on the quantized spectral data coefficients. An inverse frequency transformer (966) then performs the inverse of the operations of the frequency transformer (960), producing a reconstructed prediction residual (for a predicted frame) or reconstructed samples (for an intra-coded frame). If the frame (905) being encoded is an intra-coded frame, then the reconstructed samples form the reconstructed current frame (not shown). If the frame (905) being encoded is a predicted frame, the reconstructed prediction residual is added to the motion-compensated predictions (935) to form the reconstructed current frame. The frame store (920) buffers the reconstructed current frame for use in predicting a next frame. In some embodiments, the encoder applies a deblocking filter to the reconstructed frame to adaptively smooth discontinuities between the blocks of the frame.

The entropy coder (980) compresses the output of the quantizer (970) as well as certain side information (e.g., motion information (915), spatial extrapolation modes, quantization step size). Typical entropy coding techniques include arithmetic coding, differential coding, Huffman coding, run length coding, LZ coding, dictionary coding, and combinations of the above. The entropy coder (980) typically uses different coding techniques for different kinds of information (e.g., DC coefficients, AC coefficients, different kinds of side information), and can choose from among multiple code tables within a particular coding technique.

The entropy coder (980) puts compressed video information (995) in the buffer (990). A buffer level indicator is fed back to bit rate adaptive modules. The compressed video information (995) is depleted from the buffer (990) at a constant or relatively constant bit rate and stored for subsequent streaming at that bit rate. Therefore, the level of the buffer (990) is primarily a function of the entropy of the filtered, quantized video information, which affects the efficiency of the entropy coding. Alternatively, the encoder system (900) streams compressed video information immediately following compression, and the level of the buffer (990) also depends on the rate at which information is depleted from the buffer (990) for transmission.

Before or after the buffer (990), the compressed video information (995) can be channel coded for transmission over the network. The channel coding can apply error detection and correction data to the compressed video information (995).

B. Video Decoder

FIG. 10 is a block diagram of a general video decoder system (1000). The decoder system (1000) receives information (1095) for a compressed sequence of video frames and produces output including a reconstructed frame (1005). Particular embodiments of video decoders typically use a variation or supplemented version of the generalized decoder (1000).

The decoder system (1000) decompresses predicted frames and key frames. For the sake of presentation, FIG. 10 shows a path for key frames through the decoder system (1000) and a path for forward-predicted frames. Many of the components of the decoder system (1000) are used for decompressing both key frames and predicted frames. The exact operations performed by those components can vary depending on the type of information being decompressed.

A buffer (1090) receives the information (1095) for the compressed video sequence and makes the received information available to the entropy decoder (1080). The buffer (1090) typically receives the information at a rate that is fairly constant over time, and includes a jitter buffer to smooth short-term variations in bandwidth or transmission. The buffer (1090) can include a playback buffer and other buffers as well. Alternatively, the buffer (1090) receives information at a varying rate. Before or after the buffer (1090), the compressed video information can be channel decoded and processed for error detection and correction.

The entropy decoder (1080) entropy decodes entropy-coded quantized data as well as entropy-coded side information (e.g., motion information (1015), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (1080) frequently uses different decoding techniques for different kinds of information (e.g., DC coefficients, AC coefficients, different kinds of side information), and can choose from among multiple code tables within a particular decoding technique.

If the frame (1005) to be reconstructed is a forward-predicted frame, a motion compensator (1030) applies motion information (1015) to a reference frame (1025) to form a prediction (1035) of the frame (1005) being reconstructed. For example, the motion compensator (1030) uses a macroblock motion vector to find a macroblock in the reference frame (1025). A frame buffer (1020) stores previous reconstructed frames for use as reference frames. The motion compensator (1030) can compensate for motion at pixel, ½ pixel, ¼ pixel, or other increments, and can switch the precision of the motion compensation on a frame-by-frame basis or other basis. The precision of the motion compensation can be the same or different horizontally and vertically. Alternatively, a motion compensator applies another type of motion compensation. The prediction by the motion compensator is rarely perfect, so the decoder (1000) also reconstructs prediction residuals.

When the decoder needs a reconstructed frame for subsequent motion compensation, the frame store (1020) buffers the reconstructed frame for use in predicting a next frame. In some embodiments, the encoder applies a deblocking filter to the reconstructed frame to adaptively smooth discontinuities between the blocks of the frame.

An inverse quantizer (1070) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer (1060) converts the quantized, frequency domain data into spatial domain video information. For block-based video frames, the inverse frequency transformer (1060) applies an IDCT or variant of IDCT to blocks of the DCT coefficients, producing pixel data or prediction residual data for key frames or predicted frames, respectively. Alternatively, the frequency transformer (1060) applies another conventional inverse frequency transform such as a Fourier transform or uses wavelet or subband synthesis. In embodiments in which the decoder uses spatial extrapolation (not shown in FIG. 10) to decode blocks of key frames, the inverse frequency transformer (1060) can apply a re-oriented inverse frequency transform such as a skewed IDCT to blocks of prediction residuals for the key frame. The inverse frequency transformer (1060) applies an 8×8, 8×4, 4×8, or other size inverse frequency transforms (e.g., IDCT) to prediction residuals for predicted frames.

The decoder (1000) processes DC coefficient information when quantization step sizes are small, for example, as described below.

III. Example Bitstream Syntax and Semantics

An example bitstream includes information for a sequence of compressed progressive video frames or other pictures. The bitstream is organized into several hierarchical layers that are decoded by a decoder such as the decoder (1000) of FIG. 10. The highest layer is the sequence layer, which has information for the overall sequence of frames. Additionally, each compressed video frame is made up of data that is structured into three hierarchical layers. From top to bottom the layers are: picture, macroblock, and block.

Figure 11A:
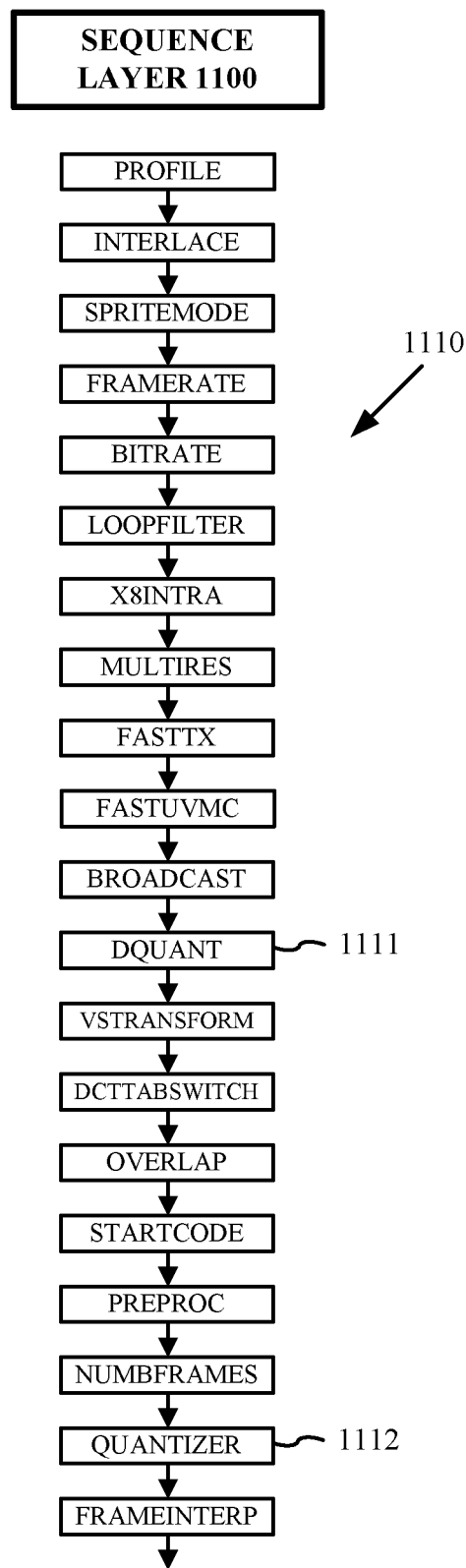
FIGS. 11A-11D are diagrams for different syntax layers of a bitstream.
Figure 11B:
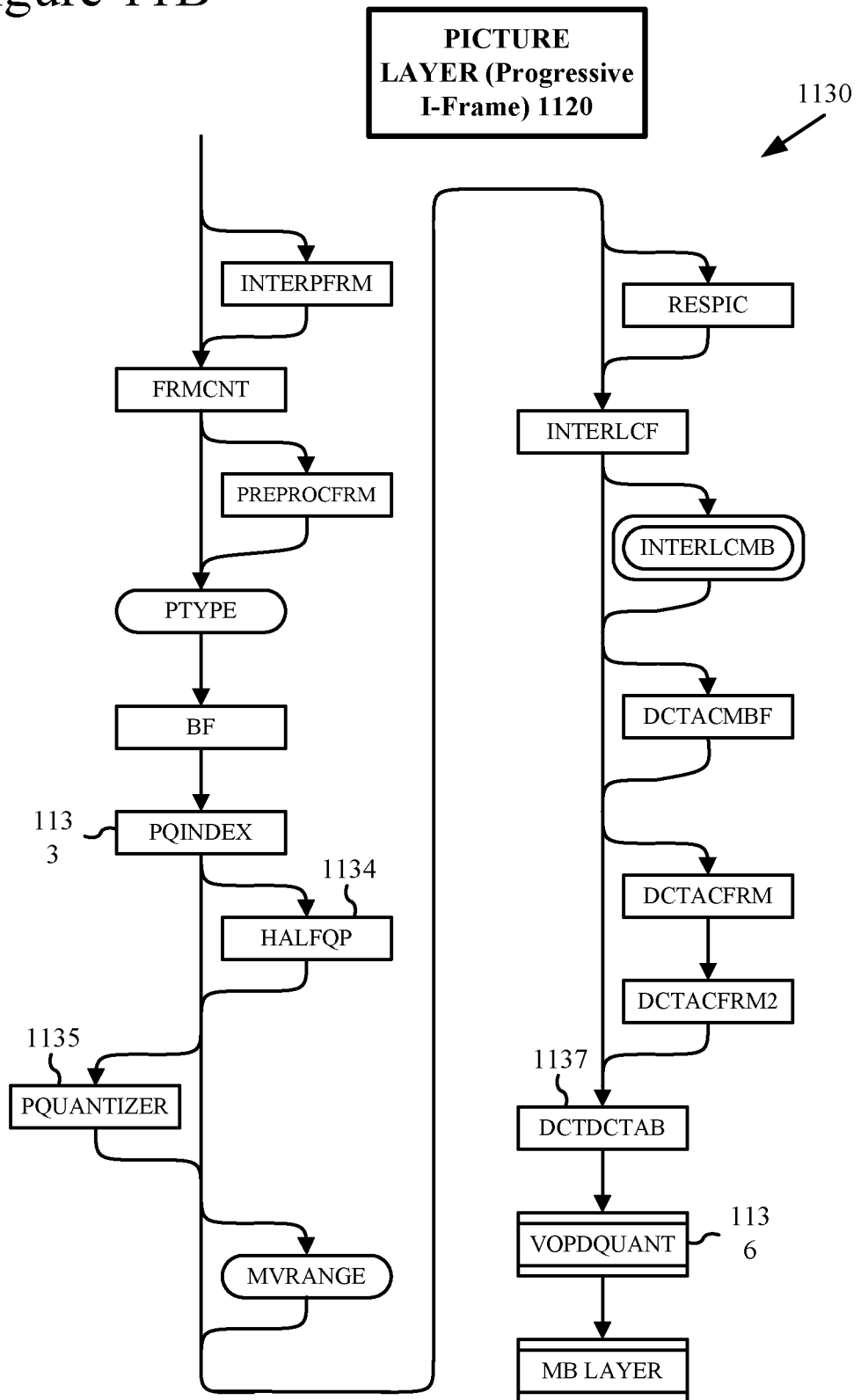

FIG. 11A is a syntax diagram for the sequence layer (1100), which includes a sequence header (1110) followed by data for the picture layer (see FIG. 11B). The sequence header (1110) includes several sequence-level elements that are processed by the decoder and used to decode the sequence, including a macroblock quantization (DQUANT) element (1111) and quantizer specifier (QUANTIZER) element (1112). DQUANT (1111) is a 2-bit field that indicates whether or not the quantization step size can vary within a frame. There are three possible values for DQUANT. If DQUANT=0, then the only one quantization step size (i.e. the frame quantization step size) can be used per frame. If DQUANT=1 or 2, then it is possible to quantize each of the macroblocks in the frame differently.

The QUANTIZER (1112) is a 2-bit fixed length code ["FLC"] field that indicates the quantizer used for the sequence. The quantizer types are encoded according to the following Table 2.

TABLE 2

Quantizer Specification

| FLC | Quantizer specification |
|---|---|
| 00 | Quantizer implicitly specified at frame level |
| 01 | Quantizer explicitly specified at frame level |
| 10 | 5 QP deadzone quantizer used for all frames |
| 11 | 3 QP deadzone quantizer used for all frames |

FIG. 11B is a syntax diagram for the picture layer (1120) for a progressive intra-frame ["progressive I-frame"]. Syntax diagrams for other pictures, such as P-frames and B-frames have many similar syntax elements. The picture layer (1120) includes a picture header (1130) followed by data for the macroblock layer. The picture header (1130) includes several picture-level elements that are processed by the decoder and used to decode the corresponding frame. Some of those elements are only present if their presence is signaled or implied by a sequence-level element or a preceding picture-level element.

For example, the picture header (1130) includes an intra transform DCT table (DCTDCTAB) element (1137). This field is present in P pictures and baseline I pictures (X8IF=0). DCTDCTAB (1137) is a 1-bit field that signals which of two sets of VLC tables is used to decode the transform DC coefficients in intra-coded blocks. If DCTDCTAB=0, then the low motion VLC tables (one for luminance DC, one for chrominance DC) are used. If DCTDCTAB=1 then the high motion VLC tables (one for luminance DC, one for chrominance DC) are used. The transform DC VLC tables are listed below.

The picture header (1130) includes a picture quantizer index (PQINDEX) element (1131). PQINDEX (1131) is a 5-bit field that signals the quantizer scale index for the entire frame. It is present in all picture types. If the implicit quantizer is used (signaled by sequence field QUANTIZER=00, see Table 2 above) then PQINDEX specifies both the picture quantizer scale (PQUANT) and the quantizer (3QP or 5QP deadzone) used for the frame. Table 3 shows how PQINDEX is translated to PQUANT and the quantizer for implicit mode.

TABLE 3

PQINDEX to PQUANT/Quantizer Deadzone Translation (Implicit Quantizer)

| PQINDEX | PQUANT | Quantizer Deadzone |
|---|---|---|
| 0 | NA | NA |
| 1 | 1 | 3 QP |
| 2 | 2 | 3 QP |
| 3 | 3 | 3 QP |
| 4 | 4 | 3 QP |
| 5 | 5 | 3 QP |
| 6 | 6 | 3 QP |
| 7 | 7 | 3 QP |
| 8 | 8 | 3 QP |
| 9 | 6 | 5 QP |
| 10 | 7 | 5 QP |
| 11 | 8 | 5 QP |
| 12 | 9 | 5 QP |
| 13 | 10 | 5 QP |
| 14 | 11 | 5 QP |
| 15 | 12 | 5 QP |
| 16 | 13 | 5 QP |
| 17 | 14 | 5 QP |
| 18 | 15 | 5 QP |
| 19 | 16 | 5 QP |
| 20 | 17 | 5 QP |
| 21 | 18 | 5 QP |
| 22 | 19 | 5 QP |
| 23 | 20 | 5 QP |
| 24 | 21 | 5 QP |
| 25 | 22 | 5 QP |
| 26 | 23 | 5 QP |
| 27 | 24 | 5 QP |
| 28 | 25 | 5 QP |
| 29 | 27 | 5 QP |
| 30 | 29 | 5 QP |
| 31 | 31 | 5 QP |

If the quantizer is signaled explicitly at the sequence or frame level (signaled by sequence field QUANTIZER=01, 10 or 11, see Table 2 above) then PQINDEX is translated to the picture quantizer step size PQUANT as indicated by Table 4.

TABLE 4

PQINDEX to PQUANT Translation (Explicit Quantizer)

| PQINDEX | PQUANT 3 QP Deadzone | PQUANT 5 QP Deadzone |
|---|---|---|
| 0 | NA | NA |
| 1 | 1 | 1 |
| 2 | 2 | 1 |
| 3 | 3 | 1 |
| 4 | 4 | 2 |
| 5 | 5 | 3 |
| 6 | 6 | 4 |
| 7 | 7 | 5 |
| 8 | 8 | 6 |
| 9 | 9 | 7 |
| 10 | 10 | 8 |
| 11 | 11 | 9 |
| 12 | 12 | 10 |
| 13 | 13 | 11 |
| 14 | 14 | 12 |
| 15 | 15 | 13 |
| 16 | 16 | 14 |
| 17 | 17 | 15 |
| 18 | 18 | 16 |
| 19 | 19 | 17 |
| 20 | 20 | 18 |
| 21 | 21 | 19 |
| 22 | 22 | 20 |
| 23 | 23 | 21 |
| 24 | 24 | 22 |
| 25 | 25 | 23 |
| 26 | 26 | 24 |
| 27 | 27 | 25 |
| 28 | 28 | 26 |
| 29 | 29 | 27 |
| 30 | 30 | 29 |
| 31 | 31 | 31 |

Alternatively, instead of the translation shown in Table 4, PQUANT is equal to PQINDEX for all values of PQINDEX from 1 through 31 when the quantizer is signaled explicitly at the sequence or frame level.

The picture header (1130) also includes a half QP step (HALFQP) element (1134) and picture quantizer type (PQUANTIZER) element (1135). HALFQP (1034) is a 1-bit field present if PQINDEX (1033) is less than or equal to 8. HALFQP (1134) allows the picture quantizer to be expressed in half step increments over the low PQUANT range. If HALFQP=1 then the picture quantizer step size is PQUANT+½. If HALFQP=0 then the picture quantizer step size is PQUANT. Therefore, if the 3QP deadzone quantizer is used then half step sizes are possible up to PQUANT=9 (i.e., PQUANT=1, 1.5, 2, 2.5 . . . 8.5, 9) and then only integer step sizes are allowable above PQUANT=9. For the 5QP deadzone quantizer, half step sizes are possible up to PQUANT=7 (i.e., 1, 1.5, 2, 2.5 . . . 6.5, 7).

PQUANTIZER (1135) is a 1-bit field present in all frame types if the sequence level field QUANTIZER=01 (see Table 2 above). In this case, the quantizer used for the frame is specified by PQUANTIZER. If PQUANTIZER=0 then the 5QP deadzone quantizer is used for the frame. If PQUANTIZER=1 then the 3QP deadzone quantizer is used.

The picture header (1130) further includes a macroblock quantization (VODPQUANT) field (1136). VODPQUANT (1136) may be used to adjust quantization step sizes for macroblocks (e.g., macroblocks at one or more edges of a frame, or on a per macroblock basis). For additional detail about VODPQUANT (1136), see U.S. patent application Ser. No. 10/623,195, filed Jul. 18, 2003.

Figure 11C:
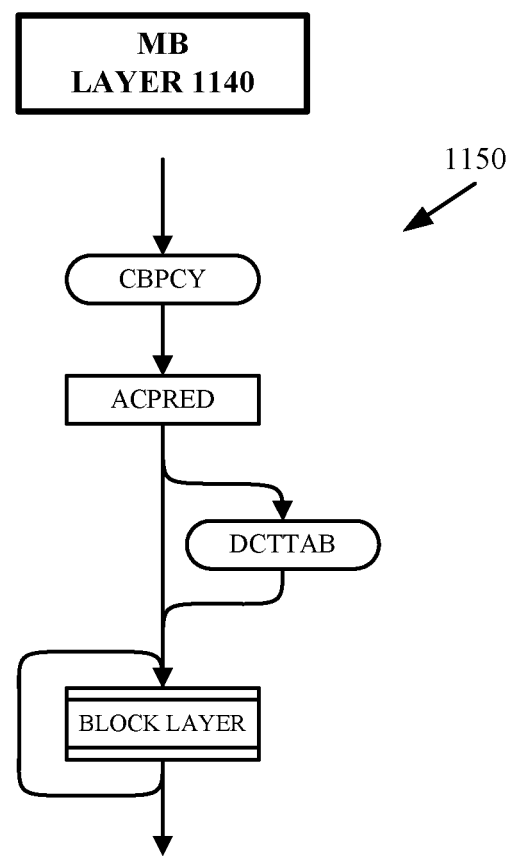

FIG. 11C is a macroblock-layer (1140) bitstream syntax diagram for progressive I-frames. The bitstream syntax for the macroblock layer of P-pictures and B-pictures contain many elements in common. Data for a macroblock consists of a macroblock header (1150) followed by block-layer data.

Figure 11D:
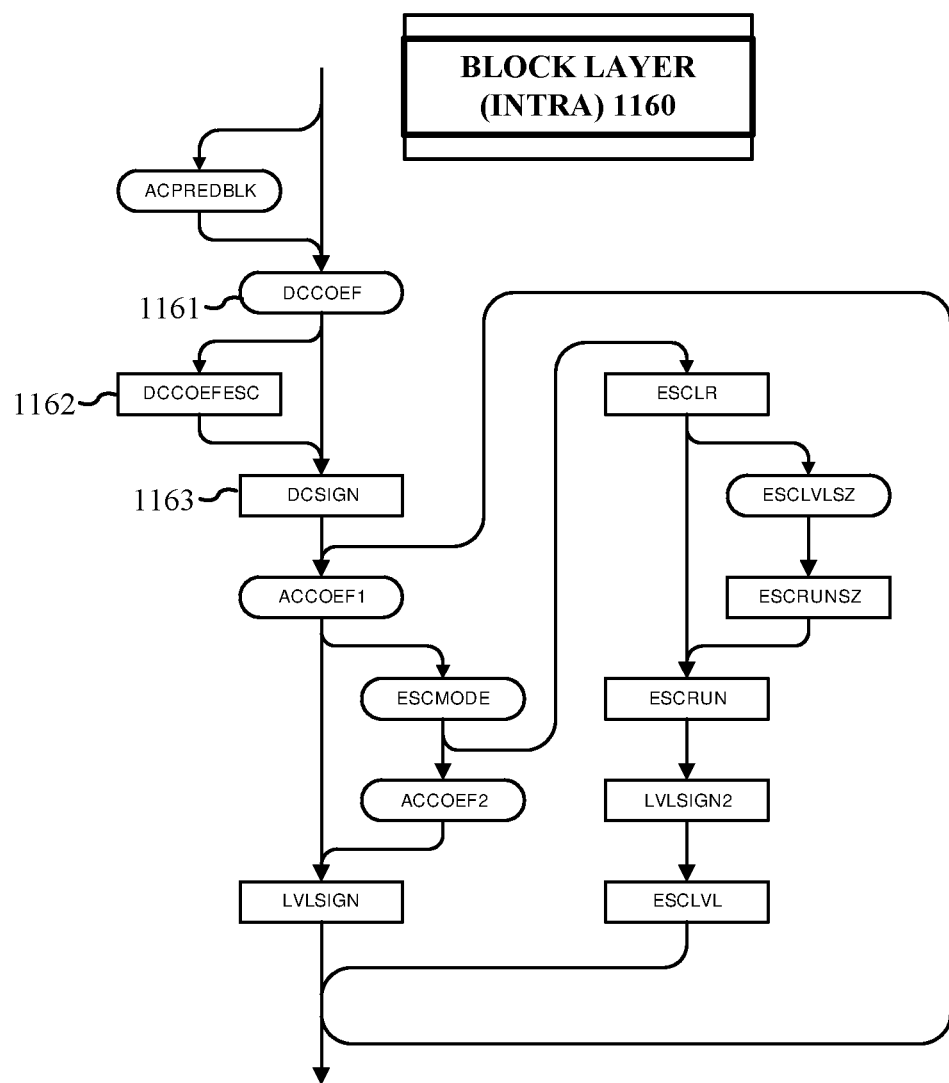

FIG. 11D is an intra-coded block-layer (1160) bitstream syntax diagram. The block-layer data includes a transform DC coefficient (DCCOEF) element (1161), an escape transform DC coefficient (DCCOEFESC) element (1162), and a transform DC sign (DCSIGN) element (1163).

The DCCOEF (1161) field is only present in intra-coded blocks. This is a variable-length codeword that encodes a transform DC differential. The transform DC decoding process is described further below. One of two sets of code tables is used to encode the DC differentials (the table is signaled in the DCTDCTAB (1137) field in the picture header as described above). The DC VLC tables are also listed below.

The DCCOEFESC (1162) field is only present in intra-coded blocks and only if DCCOEF decodes to the escape code. The size of DCCOEFESC field can be 8, 9 or 10 bits depending on the quantization step size of the block.

DCSIGN (1163) is a 1-bit value that indicates the sign of the DC differential. If DCSIGN=0 then the DC differential is positive. If DCSIGN=1 then the DC differential is negative.

IV. Example Decoding and Dequantization of DC Coefficients for Intra Blocks

For typical intra-coded blocks, a decoder such as the decoder (1000) of FIG. 10 decodes coefficients, performs inverse quantization, and performs an inverse transform.

A. Decoding DC Differentials

The DC coefficient is coded differentially with respect to an already-decoded DC coefficient neighbor. This section describes the process used to decode the bitstream to obtain the DC differential.

FIG. 11D shows the bitstream elements used to encode/decode the DC differential. DCCOEF is decoded using one of two sets of VLC tables (one for low motion and one for high motion). Each set of VLC tables includes a table for DC differentials for luminance blocks and a table for DC differentials for chrominance blocks. The table is specified by the DCTDCTAB (1137) field in the picture header. Based on the value of DCTDCTAB, one of the VLC tables listed below is used to decode DCCOEF. This will yield either:

1) zero, or 2) the absolute value of the DC differential, or 3) the escape code.

If DCCOEF decodes to zero, the value of the DC differential is also zero. Otherwise, further decoding is done to determine the value of the DC differential. If DCCOEF decodes to the escape code, the absolute value of the DC differential is encoded in the DCCOEFESC field. The size of the DCCOEFESC field is 8, 9 or 10 bits depending on the quantization step size of the block. The sign of the DC differential is obtained from the DCSIGN field. FIG. 12 lists pseudocode to illustrate the DC differential decoding process.

B. DC Differential VLC Tables

1. Low-Motion VLC Tables

TABLE 5

Low-motion Luminance DC Differential VLC Table

| DC Differential | VLC Codeword | VLC Size |
|---|---|---|
| 0 | 1 | 1 |
| 1 | 1 | 2 |
| 2 | 1 | 4 |
| 3 | 1 | 5 |
| 4 | 5 | 5 |
| 5 | 7 | 5 |
| 6 | 8 | 6 |
| 7 | 12 | 6 |
| 8 | 0 | 7 |
| 9 | 2 | 7 |
| 10 | 18 | 7 |
| 11 | 26 | 7 |
| 12 | 3 | 8 |
| 13 | 7 | 8 |
| 14 | 39 | 8 |
| 15 | 55 | 8 |
| 16 | 5 | 9 |
| 17 | 76 | 9 |
| 18 | 108 | 9 |
| 19 | 109 | 9 |
| 20 | 8 | 10 |
| 21 | 25 | 10 |
| 22 | 155 | 10 |
| 23 | 27 | 10 |
| 24 | 154 | 10 |
| 25 | 19 | 11 |
| 26 | 52 | 11 |
| 27 | 53 | 11 |
| 28 | 97 | 12 |
| 29 | 72 | 13 |
| 30 | 196 | 13 |
| 31 | 74 | 13 |
| 32 | 198 | 13 |
| 33 | 199 | 13 |
| 34 | 146 | 14 |
| 35 | 395 | 14 |
| 36 | 147 | 14 |
| 37 | 387 | 14 |
| 38 | 386 | 14 |
| 39 | 150 | 14 |
| 40 | 151 | 14 |
| 41 | 384 | 14 |
| 42 | 788 | 15 |
| 43 | 789 | 15 |
| 44 | 1541 | 16 |
| 45 | 1540 | 16 |
| 46 | 1542 | 16 |
| 47 | 3086 | 17 |
| 48 | 197581 | 23 |
| 49 | 197577 | 23 |
| 50 | 197576 | 23 |
| 51 | 197578 | 23 |
| 52 | 197579 | 23 |
| 53 | 197580 | 23 |
| 54 | 197582 | 23 |
| 55 | 197583 | 23 |
| 56 | 197584 | 23 |
| 57 | 197585 | 23 |
| 58 | 197586 | 23 |
| 59 | 197587 | 23 |
| 60 | 197588 | 23 |
| 61 | 197589 | 23 |
| 62 | 197590 | 23 |
| 63 | 197591 | 23 |
| 64 | 197592 | 23 |
| 65 | 197593 | 23 |
| 66 | 197594 | 23 |
| 67 | 197595 | 23 |
| 68 | 197596 | 23 |
| 69 | 197597 | 23 |
| 70 | 197598 | 23 |
| 71 | 197599 | 23 |

TABLE 5-continued

Low-motion Luminance DC Differential VLC Table

| DC Differential | VLC Codeword | VLC Size |
|---|---|---|
| 72 | 197600 | 23 |
| 73 | 197601 | 23 |
| 74 | 197602 | 23 |
| 75 | 197603 | 23 |
| 76 | 197604 | 23 |
| 77 | 197605 | 23 |
| 78 | 197606 | 23 |
| 79 | 197607 | 23 |
| 80 | 197608 | 23 |
| 81 | 197609 | 23 |
| 82 | 197610 | 23 |
| 83 | 197611 | 23 |
| 84 | 197612 | 23 |
| 85 | 197613 | 23 |
| 86 | 197614 | 23 |
| 87 | 197615 | 23 |
| 88 | 197616 | 23 |
| 89 | 197617 | 23 |
| 90 | 197618 | 23 |
| 91 | 197619 | 23 |
| 92 | 197620 | 23 |
| 93 | 197621 | 23 |
| 94 | 197622 | 23 |
| 95 | 197623 | 23 |
| 96 | 197624 | 23 |
| 97 | 197625 | 23 |
| 98 | 197626 | 23 |
| 99 | 197627 | 23 |
| 100 | 197628 | 23 |
| 101 | 197629 | 23 |
| 102 | 197630 | 23 |
| 103 | 197631 | 23 |
| 104 | 395136 | 24 |
| 105 | 395137 | 24 |
| 106 | 395138 | 24 |
| 107 | 395139 | 24 |
| 108 | 395140 | 24 |
| 109 | 395141 | 24 |
| 110 | 395142 | 24 |
| 111 | 395143 | 24 |
| 112 | 395144 | 24 |
| 113 | 395145 | 24 |
| 114 | 395146 | 24 |
| 115 | 395147 | 24 |
| 116 | 395148 | 24 |
| 117 | 395149 | 24 |
| 118 | 395150 | 24 |
| ESCAPE | 395151 | 24 |

TABLE 6

Low-motion Chroma DC Differential VLC Table

| DC Differential | VLC Codeword | VLC Size |
|---|---|---|
| 0 | 0 | 2 |
| 1 | 1 | 2 |
| 2 | 5 | 3 |
| 3 | 9 | 4 |
| 4 | 13 | 4 |
| 5 | 17 | 5 |
| 6 | 29 | 5 |
| 7 | 31 | 5 |
| 8 | 33 | 6 |
| 9 | 49 | 6 |
| 10 | 56 | 6 |
| 11 | 51 | 6 |
| 12 | 57 | 6 |
| 13 | 61 | 6 |
| 14 | 97 | 7 |
| 15 | 121 | 7 |
| 16 | 128 | 8 |
| 17 | 200 | 8 |

TABLE 6-continued

Low-motion Chroma DC Differential VLC Table

| DC Differential | VLC Codeword | VLC Size |
|---|---|---|
| 18 | 202 | 8 |
| 19 | 240 | 8 |
| 20 | 129 | 8 |
| 21 | 192 | 8 |
| 22 | 201 | 8 |
| 23 | 263 | 9 |
| 24 | 262 | 9 |
| 25 | 406 | 9 |
| 26 | 387 | 9 |
| 27 | 483 | 9 |
| 28 | 482 | 9 |
| 29 | 522 | 10 |
| 30 | 523 | 10 |
| 31 | 1545 | 11 |
| 32 | 1042 | 11 |
| 33 | 1043 | 11 |
| 34 | 1547 | 11 |
| 35 | 1041 | 11 |
| 36 | 1546 | 11 |
| 37 | 1631 | 11 |
| 38 | 1040 | 11 |
| 39 | 1629 | 11 |
| 40 | 1630 | 11 |
| 41 | 3256 | 12 |
| 42 | 3088 | 12 |
| 43 | 3257 | 12 |
| 44 | 6179 | 13 |
| 45 | 12357 | 14 |
| 46 | 24713 | 15 |
| 47 | 49424 | 16 |
| 48 | 3163208 | 22 |
| 49 | 3163209 | 22 |
| 50 | 3163210 | 22 |
| 51 | 3163211 | 22 |
| 52 | 3163212 | 22 |
| 53 | 3163213 | 22 |
| 54 | 3163214 | 22 |
| 55 | 3163215 | 22 |
| 56 | 3163216 | 22 |
| 57 | 3163217 | 22 |
| 58 | 3163218 | 22 |
| 59 | 3163219 | 22 |
| 60 | 3163220 | 22 |
| 61 | 3163221 | 22 |
| 62 | 3163222 | 22 |
| 63 | 3163223 | 22 |
| 64 | 3163224 | 22 |
| 65 | 3163225 | 22 |
| 66 | 3163226 | 22 |
| 67 | 3163227 | 22 |
| 68 | 3163228 | 22 |
| 69 | 3163229 | 22 |
| 70 | 3163230 | 22 |
| 71 | 3163231 | 22 |
| 72 | 3163232 | 22 |
| 73 | 3163233 | 22 |
| 74 | 3163234 | 22 |
| 75 | 3163235 | 22 |
| 76 | 3163236 | 22 |
| 77 | 3163237 | 22 |
| 78 | 3163238 | 22 |
| 79 | 3163239 | 22 |
| 80 | 3163240 | 22 |
| 81 | 3163241 | 22 |
| 82 | 3163242 | 22 |
| 83 | 3163243 | 22 |
| 84 | 3163244 | 22 |
| 85 | 3163245 | 22 |
| 86 | 3163246 | 22 |
| 87 | 3163247 | 22 |
| 88 | 3163248 | 22 |
| 89 | 3163249 | 22 |
| 90 | 3163250 | 22 |
| 91 | 3163251 | 22 |
| 92 | 3163252 | 22 |
| 93 | 3163253 | 22 |

TABLE 6-continued

Low-motion Chroma DC Differential VLC Table

| DC Differential | VLC Codeword | VLC Size |
|---|---|---|
| 94 | 3163254 | 22 |
| 95 | 3163255 | 22 |
| 96 | 3163256 | 22 |
| 97 | 3163257 | 22 |
| 98 | 3163258 | 22 |
| 99 | 3163259 | 22 |
| 100 | 3163260 | 22 |
| 101 | 3163261 | 22 |
| 102 | 3163262 | 22 |
| 103 | 3163263 | 22 |
| 104 | 6326400 | 23 |
| 105 | 6326401 | 23 |
| 106 | 6326402 | 23 |
| 107 | 6326403 | 23 |
| 108 | 6326404 | 23 |
| 109 | 6326405 | 23 |
| 110 | 6326406 | 23 |
| 111 | 6326407 | 23 |
| 112 | 6326408 | 23 |
| 113 | 6326409 | 23 |
| 114 | 6326410 | 23 |
| 115 | 6326411 | 23 |
| 116 | 6326412 | 23 |
| 117 | 6326413 | 23 |
| 118 | 6326414 | 23 |
| ESCAPE | 6326415 | 23 |

2. High-Motion Tables

TABLE 7

High-motion Luminance DC Differential VLC Table

| DC Differential | VLC Codeword | VLC Size |
|---|---|---|
| 0 | 2 | 2 |
| 1 | 3 | 2 |
| 2 | 3 | 3 |
| 3 | 2 | 4 |
| 4 | 5 | 4 |
| 5 | 1 | 5 |
| 6 | 3 | 5 |
| 7 | 8 | 5 |
| 8 | 0 | 6 |
| 9 | 5 | 6 |
| 10 | 13 | 6 |
| 11 | 15 | 6 |
| 12 | 19 | 6 |
| 13 | 8 | 7 |
| 14 | 24 | 7 |
| 15 | 28 | 7 |
| 16 | 36 | 7 |
| 17 | 4 | 8 |
| 18 | 6 | 8 |
| 19 | 18 | 8 |
| 20 | 50 | 8 |
| 21 | 59 | 8 |
| 22 | 74 | 8 |
| 23 | 75 | 8 |
| 24 | 11 | 9 |
| 25 | 38 | 9 |
| 26 | 39 | 9 |
| 27 | 102 | 9 |
| 28 | 116 | 9 |
| 29 | 117 | 9 |
| 30 | 20 | 10 |
| 31 | 28 | 10 |
| 32 | 31 | 10 |
| 33 | 29 | 10 |
| 34 | 43 | 11 |
| 35 | 61 | 11 |
| 36 | 413 | 11 |
| 37 | 415 | 11 |
| 38 | 84 | 12 |

TABLE 7-continued

High-motion Luminance DC Differential VLC Table

| DC Differential | VLC Codeword | VLC Size |
|---|---|---|
| 39 | 825 | 12 |
| 40 | 824 | 12 |
| 41 | 829 | 12 |
| 42 | 171 | 13 |
| 43 | 241 | 13 |
| 44 | 1656 | 13 |
| 45 | 242 | 13 |
| 46 | 480 | 14 |
| 47 | 481 | 14 |
| 48 | 340 | 14 |
| 49 | 3314 | 14 |
| 50 | 972 | 15 |
| 51 | 683 | 15 |
| 52 | 6631 | 15 |
| 53 | 974 | 15 |
| 54 | 6630 | 15 |
| 55 | 1364 | 16 |
| 56 | 1951 | 16 |
| 57 | 1365 | 16 |
| 58 | 3901 | 17 |
| 59 | 3895 | 17 |
| 60 | 3900 | 17 |
| 61 | 3893 | 17 |
| 62 | 7789 | 18 |
| 63 | 7784 | 18 |
| 64 | 15576 | 19 |
| 65 | 15571 | 19 |
| 66 | 15577 | 19 |
| 67 | 31140 | 20 |
| 68 | 996538 | 25 |
| 69 | 996532 | 25 |
| 70 | 996533 | 25 |
| 71 | 996534 | 25 |
| 72 | 996535 | 25 |
| 73 | 996536 | 25 |
| 74 | 996537 | 25 |
| 75 | 996539 | 25 |
| 76 | 996540 | 25 |
| 77 | 996541 | 25 |
| 78 | 996542 | 25 |
| 79 | 996543 | 25 |
| 80 | 1993024 | 26 |
| 81 | 1993025 | 26 |
| 82 | 1993026 | 26 |
| 83 | 1993027 | 26 |
| 84 | 1993028 | 26 |
| 85 | 1993029 | 26 |
| 86 | 1993030 | 26 |
| 87 | 1993031 | 26 |
| 88 | 1993032 | 26 |
| 89 | 1993033 | 26 |
| 90 | 1993034 | 26 |
| 91 | 1993035 | 26 |
| 92 | 1993036 | 26 |
| 93 | 1993037 | 26 |
| 94 | 1993038 | 26 |
| 95 | 1993039 | 26 |
| 96 | 1993040 | 26 |
| 97 | 1993041 | 26 |
| 98 | 1993042 | 26 |
| 99 | 1993043 | 26 |
| 100 | 1993044 | 26 |
| 101 | 1993045 | 26 |
| 102 | 1993046 | 26 |
| 103 | 1993047 | 26 |
| 104 | 1993048 | 26 |
| 105 | 1993049 | 26 |
| 106 | 1993050 | 26 |
| 107 | 1993051 | 26 |
| 108 | 1993052 | 26 |
| 109 | 1993053 | 26 |
| 110 | 1993054 | 26 |
| 111 | 1993055 | 26 |
| 112 | 1993056 | 26 |
| 113 | 1993057 | 26 |
| 114 | 1993058 | 26 |
| 115 | 1993059 | 26 |
| 116 | 1993060 | 26 |
| 117 | 1993061 | 26 |
| 118 | 1993062 | 26 |
| ESCAPE | 1993063 | 26 |

TABLE 8

High-motion Chroma DC Differential VLC Table

| DC Differential | VLC Codeword | VLC Size |
|---|---|---|
| 0 | 0 | 2 |
| 1 | 1 | 2 |
| 2 | 4 | 3 |
| 3 | 7 | 3 |
| 4 | 11 | 4 |
| 5 | 13 | 4 |
| 6 | 21 | 5 |
| 7 | 40 | 6 |
| 8 | 48 | 6 |
| 9 | 50 | 6 |
| 10 | 82 | 7 |
| 11 | 98 | 7 |
| 12 | 102 | 7 |
| 13 | 166 | 8 |
| 14 | 198 | 8 |
| 15 | 207 | 8 |
| 16 | 335 | 9 |
| 17 | 398 | 9 |
| 18 | 412 | 9 |
| 19 | 669 | 10 |
| 20 | 826 | 10 |
| 21 | 1336 | 11 |
| 22 | 1596 | 11 |
| 23 | 1598 | 11 |
| 24 | 1599 | 11 |
| 25 | 1654 | 11 |
| 26 | 2675 | 12 |
| 27 | 3194 | 12 |
| 28 | 3311 | 12 |
| 29 | 5349 | 13 |
| 30 | 6621 | 13 |
| 31 | 10696 | 14 |
| 32 | 10697 | 14 |
| 33 | 25565 | 15 |
| 34 | 13240 | 14 |
| 35 | 13241 | 14 |
| 36 | 51126 | 16 |
| 37 | 25560 | 15 |
| 38 | 25567 | 15 |
| 39 | 51123 | 16 |
| 40 | 51124 | 16 |
| 41 | 51125 | 16 |
| 42 | 25566 | 15 |
| 43 | 51127 | 16 |
| 44 | 51128 | 16 |
| 45 | 51129 | 16 |
| 46 | 102245 | 17 |
| 47 | 204488 | 18 |
| 48 | 13087304 | 24 |
| 49 | 13087305 | 24 |
| 50 | 13087306 | 24 |
| 51 | 13087307 | 24 |
| 52 | 13087308 | 24 |
| 53 | 13087309 | 24 |
| 54 | 13087310 | 24 |
| 55 | 13087311 | 24 |
| 56 | 13087312 | 24 |
| 57 | 13087313 | 24 |
| 58 | 13087314 | 24 |
| 59 | 13087315 | 24 |
| 60 | 13087316 | 24 |

TABLE 8-continued

High-motion Chroma DC Differential VLC Table

| DC Differential | VLC Codeword | VLC Size |
|---|---|---|
| 61 | 13087317 | 24 |
| 62 | 13087318 | 24 |
| 63 | 13087319 | 24 |
| 64 | 13087320 | 24 |
| 65 | 13087321 | 24 |
| 66 | 13087322 | 24 |
| 67 | 13087323 | 24 |
| 68 | 13087324 | 24 |
| 69 | 13087325 | 24 |
| 70 | 13087326 | 24 |
| 71 | 13087327 | 24 |
| 72 | 13087328 | 24 |
| 73 | 13087329 | 24 |
| 74 | 13087330 | 24 |
| 75 | 13087331 | 24 |
| 76 | 13087332 | 24 |
| 77 | 13087333 | 24 |
| 78 | 13087334 | 24 |
| 79 | 13087335 | 24 |
| 80 | 13087336 | 24 |
| 81 | 13087337 | 24 |
| 82 | 13087338 | 24 |
| 83 | 13087339 | 24 |
| 84 | 13087340 | 24 |
| 85 | 13087341 | 24 |
| 86 | 13087342 | 24 |
| 87 | 13087343 | 24 |
| 88 | 13087344 | 24 |
| 89 | 13087345 | 24 |
| 90 | 13087346 | 24 |
| 91 | 13087347 | 24 |
| 92 | 13087348 | 24 |
| 93 | 13087349 | 24 |
| 94 | 13087350 | 24 |
| 95 | 13087351 | 24 |
| 96 | 13087352 | 24 |
| 97 | 13087353 | 24 |
| 98 | 13087354 | 24 |
| 99 | 13087355 | 24 |
| 100 | 13087356 | 24 |
| 101 | 13087357 | 24 |
| 102 | 13087358 | 24 |
| 103 | 13087359 | 24 |
| 104 | 26174592 | 25 |
| 105 | 26174593 | 25 |
| 106 | 26174594 | 25 |
| 107 | 26174595 | 25 |
| 108 | 26174596 | 25 |
| 109 | 26174597 | 25 |
| 110 | 26174598 | 25 |
| 111 | 26174599 | 25 |
| 112 | 26174600 | 25 |
| 113 | 26174601 | 25 |
| 114 | 26174602 | 25 |
| 115 | 26174603 | 25 |
| 116 | 26174604 | 25 |
| 117 | 26174605 | 25 |
| 118 | 26174606 | 25 |
| ESCAPE | 26174607 | 25 |

C. Computing DC Predictors

The quantized DC value for a current block is obtained by adding a DC predictor to the DC differential. The DC predictor is obtained from one of the previously decoded adjacent blocks, which may be labeled candidate predictors A (from the block immediately above and to the left of the current block), B (from the block immediately above the current block), and C (from the block immediately to the left of the current block). The values for A, B and C are the quantized DC values for the respective adjacent blocks.

In some cases there are missing adjacent blocks. If the current block is in the first block row of the frame, there are no A or B (and possibly no C). If the current block is in the first block column in the frame, there are no A and C (and possibly no B) blocks. For these cases the DC predictor is set to:

$$DCPredictor=(1024+(DCStepSize>>1))/DCStepSize,$$

where DCStepSize is a value described below.

Otherwise, a prediction direction is formed based on the values of A, B and C, and either the B or C predictor is chosen. The prediction direction is calculated as follows. If the absolute value of (A-B) is less than or equal to the absolute value of (A-C), then the prediction is made from the left (C is the predictor). Otherwise, the prediction is made from the top (B is the predictor).

The quantized DC coefficient is then calculated by adding the DC differential and the DC predictor as follows:

$$DCCoeffQ=DCPredictor+DCDifferential$$

D. Inverse-Quantization for Baseline I-Frame Pictures

In each macroblock of a picture frame, the decoder decodes a DC coefficient and set of AC coefficients, which were each quantized at the encoder. These quantized transform coefficients are dequantized for a baseline I-Frame picture as described below.

1. DC Inverse-Quantization

The quantized DC coefficient (DCCoeffQ) is reconstructed by performing the following de-quantization operation:

$$DCCoefficient=DCCoeffQ*DCStepSize$$

The value of DCStepSize is based on the value of PQUANT as follows:

For PQUANT equal to 1 or 2:

$$DCStepSize=2*PQUANT$$

For PQUANT equal to 3 or 4:

$$DCStepSize=8$$

For PQUANT greater than or equal to 5:

$$DCStepSize=PQUANT/2+6$$

2. Inverse AC Coefficient Quantization

AC coefficients are separately decoded. Depending on whether the 3-QP or 5-QP deadzone quantizer is used, the non-zero quantized AC coefficients are inverse quantized according to the following formula:

$$dequant\_coeff=quant\_coeff*double\_quant \text{ (if 3-QP deadzone quantizer), or}$$

$$dequant\_coeff=quant\_coeff*double\_quant+sign(quant\_coeff)*quant\_scale \text{ (if 5-QP deadzone quantizer)}$$

where:
quant_coeff is the quantized coefficient
dequant_coeff is the inverse quantized coefficient
double_quant=2*PQUANT+HalfStep
quant_scale=PQUANT PQUANT is encoded in the picture layer as described above. HalfStep is encoded in the picture layer as via the HALFQP element as described above.

V. Signaling for DC Coefficients with Small Quantization Step Sizes, Theory

In the implementation described in detail above, the range for differential DC coefficients becomes larger as the quantization step size becomes smaller. For example, the range for a quantization step size of 2 is twice as large as the range for a quantization step size of 4. Further, the range for quantization step size of 1 is four times the range for quantization step size of 4. A VLC table used to directly encode/decode the differential DC coefficient for such small step sizes would need to be very large and would impose excessive memory requirements in some cases (e.g., in small footprint devices). Further, as the lowest quantization step sizes are infrequently or rarely used in practical encoding scenarios, the cost of this additional memory requirement would not be justified.

The problem of excessively large VLC tables for very small quantization sizes is addressed in this implementation by designing the VLC tables to accommodate the range of differential DC coefficients when the quantization step size is 4. Then, for smaller quantization step sizes (e.g., 1 and 2), a multistage approach is used to signal the differential. DC coefficient. More specifically, at a quantization step size of 2, a standard VLC table is used to decode a base VLC for the differential DC coefficient. An additional 1-bit code is also decoded, and this is used to refine the value of the differential DC coefficient. At a quantization step size of 1, a standard VLC table again is used to decode a base VLC for the differential DC coefficient. An additional 2-bit code is also decoded and used to refine the value of the differential DC coefficient.

When the base VLC represents the escape code, a further FLC is used to signal the differential DC coefficient. The size of the FLC changes with the quantization step size. For example, the FLC is 8 bits for quantization steps sizes over 2, and 9 and 10 bits for quantization step sizes of 2 and 1, respectively. This reduces bit rate for the escape code FLCs for higher quantization step sizes.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system that implements a video decoder, a method comprising:
   receiving encoded data in a bit stream for at least part of a video sequence, wherein the encoded data includes, for a given block of a picture of the video sequence:
      a first code that indicates a value for a DC differential for a DC coefficient of the given block, wherein the DC differential represents a difference between the DC coefficient and a DC predictor; and
      a second code that indicates a refinement of the value for the DC differential, wherein presence of the second code in the bit stream is conditioned on a quantization step size being 1 or 2; and
   decoding the encoded data, including, for the given block:
      decoding the first code to determine the value for the DC differential;
      decoding the second code to determine the refinement;
      determining a multiple of the value for the DC differential by multiplying the value for the DC differential by a factor that depends on the quantization step size; and
      adding the refinement to the multiple of the value for the DC differential.

2. The method of claim 1, wherein the second code has a length that varies depending on the quantization step size.

3. The method of claim 2, wherein:
   if the quantization step size is 1, the length of the second code is 2 bits; and
   if the quantization step size is 2, the length of the second code is 1 bit.

4. The method of claim 1, wherein the quantization step size is 1, and wherein the DC differential is reconstructed according to:

$$DCDifferential=DCDifferential*4+flc\_decode(2)-3,$$

where DCDifferential indicates the value for the DC differential, the factor that depends on the quantization step size is 4, and flc_decode(2) represents the second code.

5. The method of claim 1, wherein the quantization step size is 2, and wherein the DC differential is reconstructed according to:

$$DCDifferential=DCDifferential*2+flc\_decode(1)-1,$$

where DCDifferential indicates the value for the DC differential, the factor that depends on the quantization step size is 2, and flc_decode(1) represents the second code.

6. The method of claim 1, further comprising:
   decoding a third code that represents a sign for the DC differential.

7. The method of claim 6, further comprising:
   selectively modifying the DC differential depending on the sign for the DC differential.

8. One or more computer-readable memory or storage devices having stored thereon computer-executable instructions for causing one or more processing units, when programmed thereby, to perform operations, the operations comprising:
   receiving encoded data in a bit stream for at least part of a video sequence, wherein the encoded data includes, for a given block of a picture of the video sequence:
      a first code that indicates a value for a DC differential for a DC coefficient of the given block, wherein the DC differential represents a difference between the DC coefficient and a DC predictor; and
      a second code that indicates a refinement of the value for the DC differential, wherein presence of the second code in the bit stream is conditioned on a quantization step size being 1 or 2; and
   decoding the encoded data, including, for the given block:
      decoding the first code to determine the value for the DC differential;
      decoding the second code to determine the refinement;
      determining a multiple of the value for the DC differential by multiplying the value for the DC differential by a factor that depends on the quantization step size; and
      adding the refinement to the multiple of the value for the DC differential.

9. The one or more computer-readable memory or storage devices of claim 8, wherein the second code has a length that varies depending on the quantization step size.

10. The one or more computer-readable memory or storage devices of claim 9, wherein:
if the quantization step size is 1, the length of the second code is 2 bits; and
if the quantization step size is 2, the length of the second code is 1 bit.

11. The one or more computer-readable memory or storage devices of claim 8, wherein the quantization step size is 1, and wherein the DC differential is reconstructed according to:

$$DCDifferential=DCDifferential*4+flc\_decode(2)-3,$$

where DCDifferential indicates the value for the DC differential, the factor that depends on the quantization step size is 4, and flc_decode(2) represents the second code.

12. The one or more computer-readable memory or storage devices of claim 8, wherein the quantization step size is 2, and wherein the DC differential is reconstructed according to:

$$DCDifferential=DCDifferential*2+flc\_decode(1)-1,$$

where DCDifferential indicates the value for the DC differential, the factor that depends on the quantization step size is 2, and flc_decode(1) represents the second code.

13. The one or more computer-readable memory or storage devices of claim 8, wherein the operations further comprise:
decoding a third code that represents a sign for the DC differential.

14. The one or more computer-readable memory or storage devices of claim 13, wherein the operations further comprise:
selectively modifying the DC differential depending on the sign for the DC differential.

15. A computer system comprising memory and one or more processing units, wherein the computer system implements a video decoder configured to perform operations comprising:
receiving encoded data in a bit stream for at least part of a video sequence, wherein the encoded data includes, for a given block of a picture of the video sequence:
a first code that indicates a value for a DC differential for a DC coefficient of the given block, wherein the DC differential represents a difference between the DC coefficient and a DC predictor; and
a second code that indicates a refinement of the value for the DC differential, wherein presence of the second code in the bit stream is conditioned on a quantization step size being 1 or 2; and
decoding the encoded data, including, for the given block:
decoding the first code to determine the value for the DC differential;
decoding the second code to determine the refinement;
determining a multiple of the value for the DC differential by multiplying the value for the DC differential by a factor that depends on the quantization step size; and
adding the refinement to the multiple of the value for the DC differential.

16. The computer system of claim 15, wherein the second code has a length that varies depending on the quantization step size.

17. The computer system of claim 16, wherein:
if the quantization step size is 1, the length of the second code is 2 bits; and
if the quantization step size is 2, the length of the second code is 1 bit.

18. The computer system of claim 15, wherein the quantization step size is 1, and wherein the DC differential is reconstructed according to:

$$DCDifferential=DCDifferential*4+flc\_decode(2)-3,$$

where DCDifferential indicates the value for the DC differential, the factor that depends on the quantization step size is 4, and flc_decode(2) represents the second code.

19. The computer system of claim 15, wherein the quantization step size is 2, and wherein the DC differential is reconstructed according to:

$$DCDifferential=DCDifferential*2+flc\_decode(1)-1,$$

where DCDifferential indicates the value for the DC differential, the factor that depends on the quantization step size is 2, and flc_decode(1) represents the second code.

20. The computer system of claim 15, wherein the operations further comprise:
decoding a third code that represents a sign for the DC differential; and
selectively modifying the DC differential depending on the sign for the DC differential.

* * * * *